US012280468B2

(12) United States Patent
Sullivan

(10) Patent No.: US 12,280,468 B2
(45) **Date of Patent: *Apr. 22, 2025**

(54) METHOD AND DESIGN FOR PRODUCTIVE QUIET ABRASIVE BLASTING NOZZLES

(71) Applicant: Kennametal Inc., Latrobe, PA (US)

(72) Inventor: Christopher Sullivan, Honolulu, HI (US)

(73) Assignee: KENNAMETAL INC., Latrobe, PA (US)

( * ) Notice: Subject to any disclaimer, the term of this patent is extended or adjusted under 35 U.S.C. 154(b) by 506 days.

This patent is subject to a terminal disclaimer.

(21) Appl. No.: 16/819,035

(22) Filed: Mar. 13, 2020

(65) Prior Publication Data

US 2020/0282517 A1 Sep. 10, 2020

Related U.S. Application Data

(63) Continuation-in-part of application No. PCT/US2019/065783, filed on Dec. 11, 2019, which (Continued)

(51) Int. Cl.
*B24C 5/04* (2006.01)
*B05B 1/00* (2006.01)

(Continued)

(52) U.S. Cl.
CPC ................ *B24C 5/04* (2013.01); *B05B 1/002* (2018.08); *B24C 1/00* (2013.01); *B24C 3/02* (2013.01);

(Continued)

(58) Field of Classification Search
CPC .... B24C 3/02; B24C 5/02; B24C 5/04; B24C 7/0046; B24C 7/0053; B24C 7/0061; B05B 1/002; B05B 7/1481; B05B 7/1486

(Continued)

(56) References Cited

U.S. PATENT DOCUMENTS

| | | | |
|---|---|---|---|
| 578,983 | A | 3/1897 | Green |
| 1,940,972 | A | 12/1933 | Schwartzkopf |

(Continued)

FOREIGN PATENT DOCUMENTS

| | | | |
|---|---|---|---|
| CA | 2616403 | A1 | 6/2009 |
| CN | 2571492 | Y | 9/2003 |

(Continued)

OTHER PUBLICATIONS

Settles, G.S. and Garg, S., A Scientific View of the Productivity of Abrasive Blasting Nozzles, Journal of Thermal Spray Technology, Mar. 1996, pp. 35-41, vol. 5(1 ), ASM International.

(Continued)

*Primary Examiner* — Eileen P Morgan
(74) *Attorney, Agent, or Firm* — Christopher J. Owens

(57) ABSTRACT

Reduced noise abrasive blasting assemblies and systems are described. The new assemblies and systems are comprised of standard blast hose, accelerator hose, couplings and nozzle. The improved abrasive blasting system maintains abrasive particle velocity while decreasing the exit gas velocity and consequently decreasing sound production. This is accomplished through an acceleration section with reduced inner diameter and sufficient length to provide the necessary abrasive particle velocity. The new system maintains the productivity and efficiency of conventional abrasive blasting systems but with greatly reduced acoustic noise production and reduces operator fatigue due to the lower weight of the carried portion of the system.

29 Claims, 25 Drawing Sheets

SECTION A-A

Related U.S. Application Data is a continuation-in-part of application No. 16/216,972, filed on Dec. 11, 2018, now Pat. No. 11,383,349, application No. 16/819,035 is a continuation of application No. 16/216,972, filed on Dec. 11, 2018, now Pat. No. 11,383,349.

(51) Int. Cl.
*B24C 1/00* (2006.01)
*B24C 3/02* (2006.01)
*B24C 7/00* (2006.01)

(52) U.S. Cl.
CPC .......... *B24C 7/0046* (2013.01); *B24C 7/0053* (2013.01); *B24C 7/0061* (2013.01)

(58) Field of Classification Search
USPC .......................................................... 451/102
See application file for complete search history.

(56) References Cited

U.S. PATENT DOCUMENTS

| | | | | |
|---|---|---|---|---|
| 2,110,634 | A | 3/1938 | Rehmann | |
| 2,888,191 | A * | 5/1959 | Lustwerk | F04F 5/461 417/183 |
| 3,032,930 | A * | 5/1962 | Williams | B05B 1/00 451/102 |
| 3,612,405 | A | 12/1971 | Heinrich | |
| 3,628,627 | A * | 12/1971 | Arnold | B24C 5/02 181/255 |
| 3,701,482 | A | 10/1972 | Sachnik | |
| 3,788,676 | A | 1/1974 | Lossie | |
| 3,982,605 | A * | 9/1976 | Sneckenberger | B05B 1/005 239/DIG. 21 |
| 4,057,940 | A | 11/1977 | Wemmer | |
| 4,134,547 | A * | 1/1979 | Gamst | B05B 1/3402 239/404 |
| 4,253,610 | A * | 3/1981 | Larkin | B24C 5/04 417/198 |
| 4,644,974 | A * | 2/1987 | Zingg | B05B 1/00 138/40 |
| 4,666,083 | A * | 5/1987 | Yie | B24C 1/045 239/428 |
| 4,681,372 | A * | 7/1987 | McClure | E02F 3/88 299/8 |
| 4,708,214 | A | 11/1987 | Krawza | |
| 4,708,534 | A | 11/1987 | Gallant | |
| 5,283,990 | A | 2/1994 | Shank, Jr. | |
| 5,335,459 | A * | 8/1994 | Dale | B05B 7/10 451/102 |
| 5,365,702 | A | 11/1994 | Shank, Jr. | |
| 5,390,450 | A * | 2/1995 | Goenka | B24C 1/003 451/39 |
| 5,484,325 | A * | 1/1996 | Shank | B24C 5/00 451/38 |
| 5,545,073 | A * | 8/1996 | Kneisel | B05B 1/005 451/39 |
| 5,671,954 | A | 9/1997 | Cheramie | |
| 5,795,626 | A * | 8/1998 | Gabel | B24C 5/02 15/345 |
| 5,957,760 | A * | 9/1999 | LaSalle | A61C 3/025 451/90 |
| 5,975,996 | A * | 11/1999 | Settles | B24C 5/04 239/590.5 |
| 6,036,584 | A | 3/2000 | Swinkels | |
| 6,273,789 | B1 * | 8/2001 | LaSalle | A61C 3/025 433/125 |
| 6,390,898 | B1 | 5/2002 | Pieper | |
| 6,851,627 | B2 * | 2/2005 | Hashish | B24C 5/04 239/596 |
| 6,935,576 | B2 * | 8/2005 | Hara | B05B 15/55 239/398 |
| 7,059,543 | B2 * | 6/2006 | Dushkin | B05B 7/0062 239/590.5 |
| 7,484,670 | B2 * | 2/2009 | Kipp | B24C 7/0046 239/11 |
| 8,389,066 | B2 * | 3/2013 | Vijay | B05B 17/0607 427/292 |
| 8,578,971 | B2 * | 11/2013 | Brown | G01F 1/662 138/44 |
| 8,668,554 | B2 * | 3/2014 | Hunziker | B24C 7/0046 451/87 |
| 8,961,271 | B2 | 2/2015 | Roden | |
| 9,931,639 | B2 * | 4/2018 | Lehnig | B24C 7/0046 |
| 10,150,203 | B1 | 12/2018 | Sullivan et al. | |
| 2005/0037697 | A1 | 2/2005 | Nord et al. | |
| 2005/0129803 | A1 | 6/2005 | Umeda et al. | |
| 2005/0161532 | A1 * | 7/2005 | Steenkiste | B05B 7/1486 427/446 |
| 2006/0011734 | A1 * | 1/2006 | Kipp | B24C 7/0046 239/11 |
| 2006/0275554 | A1 * | 12/2006 | Zhao | C23C 24/04 427/446 |
| 2009/0283032 | A1 * | 11/2009 | Zhao | B05B 7/1486 118/302 |
| 2010/0163336 | A1 | 7/2010 | Presz, Jr. et al. | |
| 2010/0170965 | A1 * | 7/2010 | Broecker | B24C 1/003 241/5 |
| 2011/0306279 | A1 | 12/2011 | Hunziker | |
| 2013/0087633 | A1 | 4/2013 | Fukanuma | |
| 2015/0196921 | A1 | 7/2015 | Lehnig | |
| 2020/0130140 | A1 | 4/2020 | Sullivan | |
| 2021/0178552 | A1 * | 6/2021 | Tazibt | B24C 1/003 |

FOREIGN PATENT DOCUMENTS

| | | | |
|---|---|---|---|
| CN | 1739864 | A | 3/2006 |
| CN | 1939595 | A | 4/2007 |
| CN | 101121156 | A | 2/2008 |
| CN | 102814248 | A | 12/2012 |
| CN | 103874313 | A | 6/2014 |
| CN | 210588841 | U | 5/2020 |
| DE | 1036497 | B | 8/1958 |
| DE | 2903733 | A1 | 8/1980 |
| FR | 2074437 | A5 | 10/1971 |
| GB | 722464 | A | 1/1955 |
| GB | 1517679 | A | 7/1978 |
| JP | S6263205 | A | 3/1987 |
| JP | H06190310 | A | 7/1994 |
| JP | 2018141208 | A | 9/2018 |
| RU | 2246391 | C2 | 2/2005 |
| WO | 9749525 | A1 | 12/1997 |
| WO | 2022020898 | A1 | 2/2022 |
| WO | 2022115910 | A1 | 6/2022 |

OTHER PUBLICATIONS

Settles, Gary S. and Geppert, Stephen T., Redesigning Blasting Nozzles to Improve Productivity, Journal of Protective Coatings & Linings, Oct. 1996, pp. 64-72, vol. 13(10).
Powell, Alan, On the Generation of Noise by Turbulent Jets, ASME Publication, 1959.
International Search Report and Written Opinion for International Application No. PCT/US19/65783, Mar. 2020.
International Search Report and Written Opinion for International Application No. PCT/US20/25586, Jun. 26, 2020.
Adam, J., "Aeroacoustic Design of an Abrasive Blasting Nozzle Using CFD," Marquette University, 2021, 109 Pages.
International Preliminary Report on Patentability for International Application No. PCT/US2020/25586, mailed Nov. 30, 2021, 17 Pages.
Extended European Search Report for European Application No. EP20200897655, mailed Dec. 18, 2023, 14 Pages.
Jan. 30, 2024 Foreign Office Action Japanese Patent Application No. JP2022535240, 6 Pages.
Dec. 1, 2023 Foreign Office Action Chinese Application No. CN202080086029, 23 Pages.

(56) References Cited

OTHER PUBLICATIONS

Jul. 9, 2024 Foreign Office Action Japanese Patent Application No. JP2022535240, 4 Pages.

* cited by examiner

SECTION A-A

METHOD AND DESIGN FOR PRODUCTIVE QUIET ABRASIVE BLASTING NOZZLES

CROSS-REFERENCE TO RELATED APPLICATIONS

This application is a continuation-in-part of U.S. application Ser. No. 16/216,972, filed Dec. 11, 2018, and is a continuation-in-part of PCT/US19/65783, filed Dec. 11, 2019. These applications are hereby incorporated by reference in their respective entireties.

STATEMENT REGARDING FEDERALLY SPONSORED RESEARCH OR DEVELOPMENT

This invention was supported in part by the U.S. government ("Government") under Contract FA8222-14-M-0006 with the Department of the Air Force. This invention was also supported in part by the Government under Contract N68335-17-C-0581 with the Office of Naval Research. The Government therefore has certain rights in the invention.

FIELD OF THE INVENTION

The invention relates to apparatus and methods for abrasive blasting. More particularly, the invention describes reduced noise abrasive blasting assemblies and systems and methods of constructing such systems.

BACKGROUND

Abrasive blasting operations used for paint and surface coating removal are essential to the maintenance of the ships, aircraft, and land vehicles of the U.S. armed forces, as well as to industrial vehicles and machinery. But these operations expose maintenance personnel to sound pressure levels (SPLs) of 119 dB and greater on a routine basis, which result in significant health, productivity and compliance issues for blast operators. Many blast operators experience hearing loss as a direct result of prolonged exposure to blast noise. Personal protective equipment (PPE) such as earplugs and earmuffs can reduce the immediate risk but introduces a loss of situational awareness and still does not satisfy OSHA-level requirements for noise exposure limits. The OSHA noise standard (29 CFR 1910.95), limits a worker's permissible noise exposure limit (PEL) to a time-weighted average of 90 dBA for 8 hours, and better hearing protection is not considered to reduce worker noise exposure. Only by reducing sound at its source will a worker experience non-hazardous noise.

Illustrated in FIG. 1 is a conventional, state of the art supersonic abrasive blasting system 10 comprising a compressor 12, compressor hose 14, and abrasive tank 16 containing abrasive media 18. An abrasive metering valve 20 controls the rate of release of abrasive media 18 into a standard blast hose 22. Release media 18 travels through a blast hose 22 to a claw coupling 24 and through supersonic convergent-divergent nozzle 26 where it is released into the environment at supersonic speed and with considerable noise.

Details of state of the art convergent-divergent nozzle 26 are depicted in FIG. 2 in cross section. Nozzle 26 is comprised of a barrel 28 having a bore 30 with a convergent bore section 32, throat 34, and divergent bore section 36. Gases mixed with abrasive media 18 are compressed when traveling through convergent section 32 and then dispersed through divergent section 36, causing media 18 particles to accelerate within the divergent section 36 of nozzle 26 and out therefrom.

Conventional abrasive blasting system setups utilize a single 1" inner diameter blast hose 22 with a convergent-divergent type supersonic nozzle attachment 26. The abrasive blasting media in these setups undergo most of their acceleration over a short distance in and following exit from nozzle 26.

As demonstrated in Settles' paper (Settles G., *A scientific view of the productivity of abrasive blasting nozzles,* 1996), particles accelerate from fairly modest velocities before the nozzle, to higher velocities as the particles flow through the diverging portion of the nozzle and the exit. This minimizes wear in the hose, especially for highly abrasive media. This behavior is illustrated in the graphs reproduced from Settles' paper in FIG. 3, showing predicted and measured velocities through a Laval nozzle. As shown, particle velocity remains well under 50% of gas velocity throughout the nozzle Currently available abrasive blasting systems as the one depicted in FIGS. 1 and 2 produce excessive noise which exceeds levels set by occupational safety organizations for work environment noise and, as a result, require the use of personal protective equipment for hearing protection as well as time limits for operator exposure to this noise. Accordingly, there is a need for abrasive blasting systems that produce less noise, reducing noise-induced hearing loss and/or tinnitus and improving situational awareness in noisy operational environments, while still demonstrating equivalent productivity and efficiency.

Currently available abrasive blasting systems as the one depicted in FIGS. 1 and 2 are large and heavy, creating stress and fatigue for the user. As such, there is a need for abrasive blasting systems that are smaller and lighter for ease of use and longer periods of use.

SUMMARY OF THE INVENTION

These and other objects are accomplished in the reduced noise abrasive blasting assemblies and systems of the subject invention. The new assemblies and systems provide for effective abrasive blasting with significantly less noise than current state of art while reducing ergonomic stress from the size and weight of the carried portion of the systems.

The new assemblies and systems provide a greater length over which the particles are accelerated prior to exit, either in hosing, a nozzle, or both, bringing particle velocity closer to gas velocity at exit and enabling use of a lower gas exit velocity to reduce system noise while maintaining or even improving particle velocity, and thus productivity. While amount of blasting time allowed for a blasting operator is related to noise exposure (due e.g. to regulatory compliance issues), productivity of a nozzle, which is related to velocity of the abrasive exiting the nozzle, is of equal concern in abrasive blasting. A higher velocity means that the blast operator can spend less time blasting per square meter. Less time translates to higher worker productivity and lower operational costs.

New assemblies and systems in some embodiments are comprised of standard blast hose, a novel accelerator hose portion, couplings including a transition coupling, and nozzle. This improved abrasive blasting system maintains the desired abrasive particle velocity while decreasing the exit gas velocity and consequently decreasing sound production. This is accomplished through incorporation of straight accelerating sections not present in the state of the art blasting systems with sufficient length to provide the necessary abrasive particle velocity. The new systems maintain the productivity and efficiency of conventional abrasive blasting systems but with greatly reduced acoustic noise production and reduced operator fatigue due to the lower weight of the carried portion of the system.

One aspect of the subject invention is abrasive blasting apparatus that produce significantly less noise than conventional supersonic abrasive blasting systems while demonstrating equivalent or superior efficiency and blasting results when compared with prior art supersonic abrasive blasting apparatus.

A further aspect of the subject invention is abrasive blasting apparatus having a carried portion that is smaller and lighter than conventional supersonic abrasive blasting systems while demonstrating equivalent or superior efficiency and results.

Another aspect of the subject invention is abrasive blasting systems that employ a length of accelerator hose having an inside diameter smaller than conventional standard blast hose, taken over an additional length, to accelerate the media particles to a desired velocity prior to the particles entering the blast nozzle.

A further aspect of the subject invention is the use of transition coupling to step down the inner diameter of the media path from the standard blast hose to the accelerator hose.

Another aspect of the subject invention is abrasive blasting systems that employ a nozzle having a straight section following a diverging section, to accelerate the media particles to a desired velocity prior to the particles exiting the blast nozzle A further aspect of the subject invention is that the air velocity exiting the straight section that follows the diverging section is reduced as energy is transferred to the particles, thereby resulting in lower sound production from the nozzle.

New assemblies and systems in some embodiments are comprised of a hose and nozzle assembly, the hose and nozzle assembly having a first portion having a first internal diameter, a constricted portion having an internal diameter less than the first internal diameter, a converging portion connecting the first portion to the constricted portion and having a converging internal diameter, and a straight portion downstream from the constricted portion, having a constant internal diameter less than that of the first portion. The straight portion has a length such that a velocity of gas exiting the blasting nozzle assembly is reduced by at least 30% relative to the blasting nozzle assembly without the straight portion when operated with a predetermined gas/particle mix and pressure. Any reduction in noise that does not compromise productivity of the system or make the nozzle unwieldy or difficult to control is desirable. A reduction of exiting gas velocity of only 7% results in a 3 dB noise reduction, which is a noticeable improvement. In various embodiments, the length of the straight portion is effective to reduce exiting gas velocity when operated with a predetermined gas/particle mix and pressure by between 7% and 43%, in some embodiments between 30% and 40%, and in some embodiments by 35%. In operation, fluid flows through the first portion, the converging portion, the constricted portion and the straight portion in that order.

In some embodiments, the constricted portion, converging portion, and straight portion are all portions of a nozzle, which may also have a diverging portion connecting the constricted portion with the straight portion. The converging portion, constricted portion, diverging portion and straight portion may together constitute a nozzle and the constricted portion may be the throat of the nozzle. The straight portion may be at least 2/10ths the internal diameter of the straight portion in length and less than 10 times the internal diameter of the straight portion in length. The straight portion in some embodiments has a constant internal diameter, but in other embodiments has a slightly divergent profile or slightly convergent profile (5% or less change in internal diameter over the length of the straight portion). A slightly diverging or converging profile can be taken into account in calculating the appropriate length for the straight portion to achieve the desired flow within the straight portion (i.e. Mach number of 1 at or near the exit of the straight portion). In some embodiments, the straight portion has at least a section with alternating diameters that vary by, for example, 1/8", creating ridges that increase the surface friction on the inside of that section and affect the length required (which can be incorporated into the friction calculations when determining length of the straight portion), but with some possible reduction of particle speed. For a straight portion with a variable internal diameter, a reference to the diameter of this straight portion herein may be taken as a reference to the average internal diameter of the straight portion, or of the internal diameter of the straight portion at its exit. The nozzle may be a #6 nozzle. In other embodiments, it may be any diameter nozzle, including but not limited to, #4, #5, #7, #8, #9, and #10 nozzles. In some embodiments, the internal diameter of the straight portion is selected to produce a predetermined "hot spot" diameter of abrasive action.

In other embodiments, the internal diameter of the straight portion is selected to match the exit of the convergent section.

The reduced noise abrasive blasting nozzle assembly in some embodiments also includes a media tank, abrasive media, and compressed gas to carry the abrasive media, and the hose and nozzle assembly includes one or more hose sections.

The subject invention achieves sufficient abrasive particle velocity through greater acceleration distances in an airstream with a lower exit velocity, thereby reducing the nozzle generated noise experienced with supersonic blast nozzles. Adjustments to blasting productivity can be made by adjusting the abrasive mass flow rate.

At least one embodiment of the subject invention is a productive quiet abrasive nozzle comprising a convergent portion having a converging internal diameter; a throat connected to the converging portion; a diverging portion connected to the throat; and a straight portion connected to and immediately following the diverging portion. The straight portion has a length such that a velocity of gas exiting the blasting nozzle is reduced by at least 30% relative to the same blasting nozzle with the straight portion removed, assuming that both blasting nozzles are operated with the same predetermined gas and particle mix and pressure. Additionally, in operation of the productive quiet abrasive nozzle, fluid flows through the converging portion, the throat, the diverging portion, and the straight portion, in that order. In preferred embodiments, the fluid flows directly from the converging portion to the throat, to the diverging portion, to the straight portion, to the outside of the nozzle (atmosphere/environment) without any additional intervening portions.

In some embodiments, an internal diameter of the straight portion is less than a largest internal diameter of the converging portion. In some embodiments the straight portion has a constant internal diameter, and in other embodiments the internal diameter of the straight portion may vary by up to 5% over its length.

The length of the straight portion in certain embodiments is at least two-tenths of the internal diameter of the straight portion. In other embodiments, the length of the straight portion is less than ten times the internal diameter of the straight portion. In additional embodiments, the length of the straight portion is between 1" and 10". In yet further embodiments, the length of the straight portion is 2.5".

In some embodiments, the nozzle is configured such that, for a predetermined gas and particle mix and pressure, supersonic flow of the gas is isolated to the inside of the nozzle and the supersonic gas flow accelerates abrasive particles in the straight section.

In some embodiments, the nozzle is further configured such that gas Mach number for the predetermined gas and particle mix and pressure is lower at the exit of the straight portion than at the exit of the diverging portion, thereby reducing noise of operation.

In some embodiments, the nozzle is further configured such that gas Mach number for the predetermined gas and particle mix and pressure is reduced from greater than one at the exit of the diverging portion to one at the exit of the straight portion.

The straight portion in at least one embodiment of the subject invention is configured to be attached to and detached from the diverging portion. Some embodiments further comprise one or more additional straight portions configured to be attached to, and detached from, the diverging portion. The straight portion and the one or more additional straight portions may each have a different length and/or inner diameter. In some embodiments, each of the one or more additional straight portions has a length such that, when operated with a different predetermined gas and particle mix and pressure, a velocity of gas exiting the blasting nozzle is reduced by at least 30% relative to the blasting nozzle with the straight portion removed. In some embodiments, one or more of the straight portions may be configured for attachment to each other, such that total length of the straight portion can be quickly modified by attaching or removing such additional straight portions.

In some embodiments, the straight portion is cylindrical in shape.

In some embodiments, the nozzle is a #4 nozzle, a #5 nozzle, a #6 nozzle, a #7 nozzle, or a #8 nozzle. In some embodiments, the nozzle is made from a material selected from the group consisting of tungsten carbide, silicon carbide, boron carbide, acrylic, ceramic, stainless steel, hardened steel, aluminum, or combinations thereof. In yet further embodiments, the nozzle further comprises at least one protective grip.

Some embodiments of the subject invention further comprise fluid flowing through the diverging portion with a Mach number of greater than 1 at an exit from the diverging portion to the straight portion.

Some embodiments of the subject invention further comprise fluid flowing through the straight portion with a Mach number of 1 at an exit from the straight portion.

Some embodiments of the subject invention comprise a plurality of abrasive particles in supersonic fluid flow inside the nozzle, the supersonic fluid flow experiencing a shock wave in the straight portion.

In some embodiments, the length of the straight portion is such that the blasting nozzle has a noise level of 90 dBA or less when operated with the predetermined gas and particle mix and pressure. In further embodiments, the length of the straight portion is such that the blasting nozzle has a reduction in noise level of 3 dBA or more compared to the blasting nozzle without the straight portion, when operated with the predetermined gas and particle mix and pressure. In yet further embodiments, the length of the straight portion is such that the blasting nozzle has a reduction in noise level of 6 dBA or more compared to the blasting nozzle without the straight portion, when operated with the predetermined gas and particle mix and pressure.

In some embodiments, the length L of the straight portion is at least L*, as given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight section, M is the Mach number of the fluid at an entrance to the straight portion, $\bar{f}$ is the average friction factor of the straight portion, $f_{abrasives}$ is the friction factor of the particles in the fluid flow, and γ is the specific heat ratio of the fluid flow, for a predetermined gas and abrasive particle mixture.

In some embodiments, the length L of the straight portion is at least L* adjusted for a ratio of back pressure to exit pressure, where L* is given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight section, M is the Mach number of the fluid at an entrance to the straight portion, f is the average friction factor of the straight portion, $f_{abrasives}$ is the friction factor of the particles in the fluid flow, and γ is the specific heat ratio of the fluid flow, for a predetermined gas and abrasive particle mixture. In other words, L* may be calculated according to the above equation, and then length L adjusted from L* to account for a ratio of back pressure to exit pressure other than 1.

The subject invention in its various embodiments also includes a method for manufacturing a productive quiet abrasive blasting nozzle, such as, for instance, the productive quiet abrasive blasting nozzle described above herein that comprises a convergent portion having a converging internal diameter; a throat connected to the converging portion; a diverging portion connected to the throat; and a straight portion connected to the diverging portion, with the straight portion having a length such that a velocity of gas exiting the blasting nozzle is reduced by at least 30% relative to the same blasting nozzle with the straight portion removed, assuming that both blasting nozzles are operated with the same predetermined gas and particle mix and pressure, and where, in operation of the nozzle, fluid flows through the converging portion, the throat, the diverging portion, and the straight portion, in that order. Such a method comprises, for the predetermined gas and abrasive particle mixture and pressure, determining a minimum length of the straight portion required to produce a Mach number of 1 for the gas at, or within, one straight section internal diameter before the exit from the straight portion; and manufacturing the nozzle with a straight portion having a length equal to or greater than the minimum length.

In some embodiments, the method further comprises determining an optimal length of the straight portion such that Mach number of the gas decreases from a peak at a first point being the end of the diverging portion to a Mach number of 1 at a second point at, or within, a length equal to an internal diameter of the straight portion before the exit of the straight portion without going subsonic between the first point and the second point; and manufacturing the nozzle with a straight portion having the optimal length.

In some embodiments, the determining the optimal length step comprises analyzing an effect of friction from walls of the straight section, and/or analyzing an effect of the plurality of abrasive particles reducing air flow velocity in the straight portion.

In some embodiments, the method further comprises adjusting the length of the straight portion for specific operating conditions to determine which length produces a desired combination of sound reduction and productivity, and manufacturing the nozzle to have that length.

In some embodiments, the method further comprises conducting iterative computer simulations of the productive quiet abrasive blasting nozzles described above herein over a range of straight portion lengths to find a length having a desired combination of sound reduction and productivity, and manufacturing the nozzle to have that length.

The subject invention in its various embodiments additionally includes a nozzle attachment for productive quiet abrasive blasting, the nozzle attachment comprising a straight tube adapted for connecting to the exit of an abrasive blasting nozzle. The straight tube has a length such that a velocity of gas exiting the abrasive blasting nozzle with the straight tube attached is reduced by at least 30% relative to the abrasive blasting nozzle without the straight tube connected, when operated with a predetermined gas and particle mix and pressure. In preferred embodiments, the straight tube has a constant internal diameter along its entire length. In some embodiments, the internal diameter of the straight tube may vary up to 5% over its length. In preferred embodiments, the inner diameter of the straight tube (particularly at the inlet) is set to match the internal diameter at the exit of a given abrasive blasting nozzle or set of abrasive blasting nozzles with which the straight tube is intended to be used. In preferred embodiments, there is no diverging or converging portion of or attachment to the straight tube and when the nozzle attachment is mounted on an abrasive blasting nozzle, fluid flow passes directly from the diverging portion of the nozzle into the straight tube nozzle attachment and from the straight tube directly into the atmosphere/environment (for example, towards a target surface for abrasive blasting). Similarly, for embodiments where a straight portion is built into the end of an abrasive blasting nozzle as, for example, described above, fluid may flow directly from the diverging portion into the straight portion and from the straight portion into the atmosphere/environment, without any intervening portions.

In at least one aspect of the nozzle attachment, the abrasive blasting nozzle is a #4 nozzle, a #5 nozzle, a #6 nozzle, a #7 nozzle, or a #8 nozzle. Numerical sizing of nozzles (#6, #8, etc.) is a well known sizing measure based on orifice size (internal diameter at the exit).

In some embodiments, the nozzle attachment further comprises a securing device for connecting the straight tube to the abrasive blasting nozzle.

In some embodiments, the nozzle attachment further comprises a securing device built into the straight tube to assist with connecting the straight tube to the abrasive blasting nozzle.

In further aspects of the nozzle attachment, the internal diameter of the straight tube is less than a largest internal diameter of a converging portion of the abrasive blasting nozzle.

In other aspects of the nozzle attachment, the straight tube is configured such that, for the predetermined gas and particle mix and pressure, when the straight tube is connected to the abrasive blasting nozzle supersonic flow of the gas does not continue beyond an exit of the straight tube and the supersonic gas flow accelerates the abrasive particles in the straight tube.

In yet other aspects of the nozzle attachment, the straight tube is configured such that, when the straight tube is connected to the abrasive blasting nozzle, gas Mach number for the predetermined gas and particle mix and pressure is lower at the exit of the straight tube than at the exit of a diverging portion of the abrasive blasting nozzle, thereby reducing noise of operation.

In further aspects of the nozzle attachment, the straight tube is configured such that, when the straight tube is connected to the abrasive blasting nozzle, gas Mach number for the predetermined gas and particle mix and pressure is reduced from greater than one at the exit of a diverging portion of the abrasive blasting nozzle to one at the exit of the straight portion.

In additional aspects of the nozzle attachment, a length of the straight tube is at least two-tenths of a diameter of the straight tube. A length of the straight tube in some embodiments is less than ten times a diameter of the straight tube. In further embodiments, a length of the straight tube is between 1" and 10". In yet further embodiments, a length of the straight tube is 2.5".

In other aspects of the nozzle attachment, the straight tube is cylindrical in shape. In some embodiments, the straight tube is made from a material selected from the group consisting of tungsten carbide, silicon carbide, boron carbide, acrylic, ceramic, stainless steel, hardened steel, aluminum, or combinations thereof.

In further aspects of the nozzle attachment, a length of the straight tube is such that, when the straight tube is connected to the abrasive blasting nozzle, the blasting nozzle has a noise level of 90 dBA or less when operated with the predetermined gas and particle mix and pressure. In yet further aspects of the nozzle embodiment, a length of the straight tube is such that, when the straight tube is connected to the abrasive blasting nozzle, the blasting nozzle has a reduction in noise level of 3 dBA or more compared to the blasting nozzle without the straight tube, when operated with the predetermined gas and particle mix and pressure. In still further aspects of the nozzle embodiment, a length of the straight tube is such that, when the straight tube is connected to the abrasive blasting nozzle, the blasting nozzle has a reduction in noise level of 6 dBA or more compared to the blasting nozzle without the straight tube, when operated with the predetermined gas and particle mix and pressure.

Additional aspects of the nozzle attachment have a length, L, of the straight tube where L is at least L*, as given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight tube, M is the Mach number of fluid at an entrance to the straight portion, f is the average friction factor of the straight portion, $f_{abrasives}$ is the friction factor of the particles in the fluid flow, and γ is the specific heat ratio of the fluid flow, for the predetermined gas and abrasive particle mixture with the straight tube connected to the abrasive blasting nozzle.

Some aspects of the nozzle attachment have a length, L, of the straight tube where L is at least L* adjusted for a ratio of back pressure to exit pressure, where L* is given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight tube, M is the Mach number of fluid at an entrance to the straight portion, f is the average friction factor of the straight portion, $f_{abrasives}$ is the friction factor of the particles in the fluid flow, and γ is the specific heat ratio of the fluid flow, for the predetermined gas and abrasive particle mixture with the straight tube connected to the abrasive blasting nozzle.

The subject invention in its various embodiments further includes a method of manufacturing the nozzle attachment described above herein to reduce noise of a connected abrasive blasting nozzle without reducing productivity of the nozzle. The method comprises, for the predetermined gas and abrasive particle mixture and pressure, determining a minimum length of the straight tube of the nozzle attachment described above herein required to produce a Mach number of 1 for the gas at, or within, one straight tube internal diameter before the exit from the straight portion; and manufacturing the straight tube having a length equal to or greater than the minimum length.

In some embodiments, the method of manufacturing the nozzle attachment described above herein further comprises determining an optimal length of the straight tube of the nozzle attachment described above herein such that Mach number of the gas decreases from a peak at a first point being the end of a diverging portion of the connected abrasive blasting nozzle to a Mach number of 1 at a second point at, or within, a length equal to an internal diameter of the straight tube before the exit of the straight tube without going subsonic between the first point and the second point; and manufacturing the straight tube having the optimal length.

In some embodiments, the determining an optimal length step comprises analyzing an effect of friction from walls of the straight tube, and/or analyzing an effect of the plurality of abrasive particles reducing air flow velocity in the straight tube.

In some embodiments, the method of manufacturing the nozzle attachment described above herein further comprises adjusting the length of the straight tube for specific operating conditions to determine which length produces a desired combination of sound reduction and productivity, and manufacturing the straight tube to have that length.

In some embodiments, the method for manufacturing the nozzle attachment described above herein further comprises conducting iterative computer simulations of straight tubes of the nozzle attachment described above herein over a range of straight tube lengths to find a length having a desired combination of sound reduction and productivity, and manufacturing the straight tube to have that length.

Generally, any known abrasive blasting nozzle may be adapted to be a nozzle according to an embodiment of the present invention. For example, an existing #2, 3, 4, 5, 6, 7, 8, 9, 10, 11, or 12 nozzle may be adapted to have a straight portion at the end of the diverging portion of the nozzle, as described herein, to achieve an embodiment of the present invention. Similarly, nozzle attachments according to embodiments of the present invention may be adapted for attachment to any known abrasive blasting nozzle. Once a nozzle attachment is mounted on an existing nozzle, the assembly as a whole (i.e. the existing nozzle, in combination with the attached nozzle attachment) may be considered a productive quiet abrasive blasting nozzle. Further, abrasive blasting nozzle and nozzle attachments according to embodiments of the present invention may be adapted for use in a wide variety of applications and in a wide variety of operating conditions-including pressure, particle loading, type of abrasive particle and of fluid, nozzle material, etc. In particular, any given nozzle or nozzle attachment according to an embodiment of the present invention may be adapted to achieve certain results, or results within a certain range, for a predetermined gas and particle mix and pressure, or for a predetermined range of gas and particle mixtures and pressures. Nozzles and nozzle attachments according to embodiments of the present invention may for example be adapted to achieve a noise reduction of at least 3 dB relative to prior art abrasive blasting nozzles for a predetermined gas and particle mix and pressure, including a nozzle pressure between 20 psi and 200 psi and a particle loading of 50-10,000 lbs per hour abrasive consumption rate, or any range of pressures and particle loadings within those ranges. Such conditions are applicable for #2, 3, 4, 5, 6, 7, 8, 9, 10, 11, and 12 nozzles, for example. Particle loading may be determined in part by what type of roughness profile the blaster wants to have, as well as the blasting pressure used. A predetermined gas and particle mixture may for example be of compressed air and sand, and/or any other abrasive particles. The phrase "a predetermined gas and particle mix and pressure" may consist of a gas type, a particle type, a nozzle pressure, a back pressure, and a particle loading. Back pressure is normally atmospheric pressure, and can be assumed to be atmospheric pressure if not specifically mentioned. For example compressed air with sand particles, a nozzle pressure of 100 psi and particle loading of 1,000 lbs/hour is one exemplary predetermined gas and particle mix and pressure.

Additional embodiments of the subject invention include a productive quiet abrasive blasting nozzle assembly comprising the productive quiet abrasive nozzle described above herein.

The principles of the invention described may be applied to applications outside of abrasive blasting where the sound level of fluid flow is problematic, even those that do not utilize nozzles. Particularly, in applications where supersonic fluid flow results in high noise levels, flowing the fluid through a straight tube before entering the atmosphere/environment may reduce velocity of the fluid. Where the straight tube is sized to induce a shock at or just before exit of the fluid into the environment, noise levels are particularly reduced. Even in non-supersonic flow, the straight tube reduces velocities and noise levels. The use of a straight tube is especially useful in applications where the fluid is used to accelerate particles or other bodies within the fluid flow which are at lower velocity than the fluid, as the straight portion can reduce velocity of the fluid while increasing velocity of the entrained objects, thereby reducing noise levels without sacrificing productivity.

Therefore, based on the foregoing and continuing description, the subject invention in its various embodiments may comprise one or more of the following features in any non-mutually-exclusive combination:

A productive quiet abrasive blasting nozzle with a converging portion having a converging internal diameter;

A productive quiet abrasive blasting nozzle with a throat connected to the converging portion;

A productive quiet abrasive blasting nozzle with a diverging portion connected to a throat;

A productive quiet abrasive blasting nozzle with a straight portion connected to and immediately following the diverging portion;

A productive quiet abrasive blasting nozzle having a straight portion with a length such that a velocity of gas exiting the blasting nozzle is reduced by at least 30% relative to the blasting nozzle with the straight portion removed, when operated with a predetermined gas and particle mix and pressure;

A productive quiet abrasive blasting nozzle where, in operation, fluid flows through the converging portion, the throat, the diverging portion, and the straight portion, in that order;

A productive quiet abrasive blasting nozzle where an internal diameter of the straight portion is less than a largest internal diameter of the converging portion;

A productive quiet abrasive blasting nozzle where the nozzle is configured such that, for the predetermined gas and particle mix and pressure, supersonic flow of the gas is isolated to the inside of the nozzle and the supersonic gas flow accelerates the abrasive particles in the straight section;

A productive quiet abrasive blasting nozzle where the nozzle is configured such that gas Mach number for the predetermined gas and particle mix and pressure is lower at the exit of the straight portion than at the exit of the diverging portion, thereby reducing noise of operation;

A productive quiet abrasive blasting nozzle where the nozzle is configured such that gas Mach number for the predetermined gas and particle mix and pressure is reduced from greater than one at the exit of the diverging portion to one at the exit of the straight portion;

A productive quiet abrasive blasting nozzle where the length of the straight portion is at least two-tenths of the internal diameter of the straight portion;

A productive quiet abrasive blasting nozzle where the length of the straight portion is less than ten times the internal diameter of the straight portion;

A productive quiet abrasive blasting nozzle where the length of the straight portion is between 1" and 10";

A productive quiet abrasive blasting nozzle where the length of the straight portion is 2.5";

A productive quiet abrasive blasting nozzle where the straight portion is configured to be attached to and detached from the diverging portion;

A productive quiet abrasive blasting nozzle further comprising one or more additional straight portions configured to be attached to and detached from the diverging portion, wherein the straight portion and the one or more additional straight portions each have a different length and/or inner diameter;

A productive quiet abrasive blasting nozzle where each of the one or more additional straight portions has a length such that, when operated with a different predetermined gas and particle mix and pressure, a velocity of gas exiting the blasting nozzle is reduced by at least 30% relative to the blasting nozzle with the straight portion removed;

A productive quiet abrasive blasting nozzle where the straight portion is cylindrical in shape;

A productive quiet abrasive blasting nozzle where the nozzle is a #4 nozzle, a #5 nozzle, a #6 nozzle, a #7 nozzle, or a #8 nozzle;

A productive quiet abrasive blasting nozzle where the nozzle is made from a material selected from the group consisting of tungsten carbide, silicon carbide, boron carbide, acrylic, ceramic, stainless steel, hardened steel, aluminum, or combinations thereof;

A productive quiet abrasive blasting nozzle where the nozzle further comprises at least one protective grip;

A productive quiet abrasive blasting nozzle further comprising fluid flowing through the diverging portion with a Mach number of greater than 1 at an exit from the diverging portion to the straight portion;

A productive quiet abrasive blasting nozzle further comprising fluid flowing through the straight portion with a Mach number of 1 at an exit from the straight portion;

A productive quiet abrasive blasting nozzle further comprising a plurality of abrasive particles in supersonic fluid flow inside the nozzle, the supersonic fluid flow experiencing a shock wave in the straight portion;

A productive quiet abrasive blasting nozzle where the length of the straight portion is such that the blasting nozzle has a noise level of 90 dBA or less when operated with the predetermined gas and particle mix and pressure;

A productive quiet blasting nozzle where the length of the straight portion is such that the blasting nozzle has a reduction in noise level of 3 dBA or more compared to the blasting nozzle without the straight portion, when operated with the predetermined gas and particle mix and pressure;

A productive quiet blasting nozzle where the length of the straight portion is such that the blasting nozzle has a reduction in noise level of 6 dBA or more compared to the blasting nozzle without the straight portion, when operated with the predetermined gas and particle mix and pressure;

A productive quiet abrasive blasting nozzle where the length, L, of the straight portion is at least L*, as given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight section, M is the Mach number of the fluid at an entrance to the straight portion, $\bar{f}$ is the average friction factor of the straight portion, $f_{abrasives}$ is the friction factor of the particles in the fluid flow, and γ is the specific heat ratio of the fluid flow, for a predetermined gas and abrasive particle mixture; A productive quiet abrasive blasting nozzle where the length, L, of the straight portion is at least L* adjusted for a ratio of back pressure to exit pressure, where L* is given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight section, M is the Mach number of the fluid at an entrance to the straight portion, $\bar{f}$ is the average friction factor of the straight portion, $f_{abrasives}$ is the friction factor of the particles in the fluid flow, and $\gamma$ is the specific heat ratio of the fluid flow, for a predetermined gas and abrasive particle mixture;

A method for manufacturing the productive quiet abrasive blasting nozzle described above herein to reduce noise of the nozzle without reducing productivity of the nozzle, the method comprising, for the predetermined gas and abrasive particle mixture and pressure, determining a minimum length of the straight portion of the productive quiet abrasive blasting nozzle described above herein required to produce a Mach number of 1 for the gas at, or within, one straight section internal diameter before the exit from the straight portion; and manufacturing the nozzle with a straight portion having a length equal to or greater than the minimum length;

A method for manufacturing the productive quiet abrasive blasting nozzle described above herein, the method further comprising determining an optimal length of the straight portion of the productive quiet abrasive blasting nozzle described above herein such that Mach number of the gas decreases from a peak at a first point being the end of the diverging portion to a Mach number of 1 at a second point at, or within, a length equal to an internal diameter of the straight portion before the exit of the straight portion without going subsonic between the first point and the second point; and manufacturing the nozzle with a straight portion having the optimal length;

A method for manufacturing the productive quiet abrasive blasting nozzle described above herein, where the determining an optimal length step comprises analyzing an effect of friction from walls of the straight section, and/or analyzing an effect of the plurality of abrasive particles reducing air flow velocity in the straight portion;

A method for manufacturing the productive quiet abrasive blasting nozzle described above herein, the method further comprising adjusting the length of the straight portion for specific operating conditions to determine which length produces a desired combination of sound reduction and productivity, and manufacturing the nozzle to have that length;

A method for manufacturing the productive quiet abrasive blasting nozzle described above herein, the method further comprising conducting iterative computer simulations of the productive quiet abrasive blasting nozzle described above herein over a range of straight portion lengths to find a length having a desired combination of sound reduction and productivity, and manufacturing the nozzle to have that length;

A nozzle attachment for productive quiet abrasive blasting, the nozzle comprising a straight tube for connecting to the exit of an abrasive blasting nozzle, where the straight tube has a length such that a velocity of gas exiting the abrasive blasting nozzle is reduced by at least 30% with the straight tube connected, when operated with a predetermined gas and particle mix and pressure;

A nozzle attachment for productive quiet abrasive blasting, where the abrasive blasting nozzle is a #4 nozzle, a #5 nozzle, a #6 nozzle, a #7 nozzle, or a #8 nozzle;

A nozzle attachment for productive quiet abrasive blasting, the nozzle further comprising a securing device for connecting the straight tube to the abrasive blasting nozzle;

A nozzle attachment for productive quiet abrasive blasting, the nozzle further comprising a securing device built into the straight tube to assist with connecting the straight tube to the abrasive blasting nozzle;

A nozzle attachment for productive quiet abrasive blasting where the internal diameter of the straight tube is less than a largest internal diameter of a converging portion of the abrasive blasting nozzle;

A nozzle attachment for productive quiet abrasive blasting where the straight tube is configured such that, for the predetermined gas and particle mix and pressure, when the straight tube is connected to the abrasive blasting nozzle supersonic flow of the gas does not continue beyond an exit of the straight tube and the supersonic gas flow accelerates the abrasive particles in the straight tube;

A nozzle attachment for productive quiet abrasive blasting where the straight tube is configured such that, when the straight tube is connected to the abrasive blasting nozzle, gas Mach number for the predetermined gas and particle mix and pressure is lower at the exit of the straight tube than at the exit of a diverging portion of the abrasive blasting nozzle, thereby reducing noise of operation;

A nozzle attachment for productive quiet abrasive blasting where straight tube is configured such that, when the straight tube is connected to the abrasive blasting nozzle, gas Mach number for the predetermined gas and particle mix and pressure is reduced from greater than one at the exit of a diverging portion of the abrasive blasting nozzle to one at the exit of the straight portion;

A nozzle attachment for productive quiet abrasive blasting where a length of the straight tube is at least two-tenths of a diameter of the straight tube;

A nozzle attachment for productive quiet abrasive blasting where a length of the straight tube is less than ten times a diameter of the straight tube;

A nozzle attachment for productive quiet abrasive blasting where a length of the straight tube is between 1" and 10";

A nozzle attachment for productive quiet abrasive blasting where a length of the straight tube is 2.5";

A nozzle attachment for productive quiet abrasive blasting where the straight tube is cylindrical in shape;

A nozzle attachment for productive quiet abrasive blasting where the straight tube is made from a material selected from the group consisting of tungsten carbide, silicon carbide, boron carbide, acrylic, ceramic, stainless steel, hardened steel, aluminum, or combinations thereof;

A nozzle attachment for productive quiet abrasive blasting where a length of the straight tube is such that, when the straight tube is connected to the abrasive blasting nozzle, the blasting nozzle has a noise level of 90 dBA or less when operated with the predetermined gas and particle mix and pressure;

A nozzle attachment for productive quiet abrasive blasting where a length of the straight tube is such that, when the straight tube is connected to the abrasive blasting nozzle, the blasting nozzle has a reduction in noise level of 3 dBA or more compared to the blasting nozzle without the straight tube, when operated with the predetermined gas and particle mix and pressure;

A nozzle attachment for productive quiet abrasive blasting where a length of the straight tube is such that, when the straight tube is connected to the abrasive blasting nozzle, the blasting nozzle has a reduction in noise level of 6 dBA or more compared to the blasting nozzle without the straight tube, when operated with the predetermined gas and particle mix and pressure;

A nozzle attachment achieving a predetermined noise level reduction for a nozzle pressure between 20 psi and 200 psi and a particle loading of 50-10,000 lbs per hour abrasive consumption rate, or any values or ranges of values within those ranges.

A nozzle attachment for productive quiet abrasive blasting where a length, L, of the straight tube is at least L*, as given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight tube, M is the Mach number of fluid at an entrance to the straight portion, $\bar{f}$ is the average friction factor of the straight portion, $f_{abrasives}$ is the friction factor of the particles in the fluid flow, and $\gamma$ is the specific heat ratio of the fluid flow, for the predetermined gas and abrasive particle mixture with the straight tube connected to the abrasive blasting nozzle;

A nozzle attachment for productive quiet abrasive blasting where a length, L, of the straight tube is at least L* adjusted for a ratio of back pressure to exit pressure, where L* is given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight tube, M is the Mach number of fluid at an entrance to the straight portion, $\bar{f}$ is the average friction factor of the straight portion, $f_{abrasives}$ is the friction factor of the particles in the fluid flow, and $\gamma$ is the specific heat ratio of the fluid flow, for the predetermined gas and abrasive particle mixture with the straight tube connected to the abrasive blasting nozzle;

Multiple nozzle attachments configured to connect to each other to combine their lengths A method for manufacturing the nozzle attachment described above herein to reduce noise of a connected abrasive blasting nozzle without reducing productivity of the nozzle, the method comprising, for the predetermined gas and abrasive particle mixture and pressure, determining a minimum length of the straight tube of the nozzle attachment described above herein required to produce a Mach number of 1 for the gas at, or within, one straight tube internal diameter before the exit from the straight portion; and manufacturing the straight tube having a length equal to or greater than the minimum length;

A method for manufacturing the nozzle attachment described above herein to reduce noise of a connected abrasive blasting nozzle without reducing productivity of the nozzle, the method further comprising determining an optimal length of the straight tube of the nozzle attachment described above herein such that Mach number of the gas decreases from a peak at a first point being the end of a diverging portion of the connected abrasive blasting nozzle to a Mach number of 1 at a second point at, or within, a length equal to an internal diameter of the straight tube before the exit of the straight tube without going subsonic between the first point and the second point; and manufacturing the straight tube having the optimal length;

A method for manufacturing the nozzle attachment described above herein to reduce noise of a connected abrasive blasting nozzle without reducing productivity of the nozzle, where the determining an optimal length step comprises analyzing an effect of friction from walls of the straight tube, and/or analyzing an effect of the plurality of abrasive particles reducing air flow velocity in the straight tube;

A method for manufacturing the nozzle attachment described above herein to reduce noise of a connected abrasive blasting nozzle without reducing productivity of the nozzle, the method further comprising adjusting the length of the straight tube for specific operating conditions to determine which length produces a desired combination of sound reduction and productivity, and manufacturing the straight tube to have that length;

A method for manufacturing the nozzle attachment described above herein to reduce noise of a connected abrasive blasting nozzle without reducing productivity of the nozzle, the method further comprising conducting iterative computer simulations of straight tubes of the nozzle attachment described above herein over a range of straight tube lengths to find a length having a desired combination of sound reduction and productivity, and manufacturing the straight tube to have that length; and A productive quiet abrasive blasting nozzle assembly comprising a productive quiet abrasive blasting nozzle described above herein.

A nozzle or nozzle attachment having a terminal straight portion which has 5% or less change in internal diameter over its length

DETAILED DESCRIPTION OF PREFERRED EMBODIMENTS

Solutions to the problem of excessive noise from state of the art supersonic abrasive blasting systems are found as set forth in the following.

Figure 4:
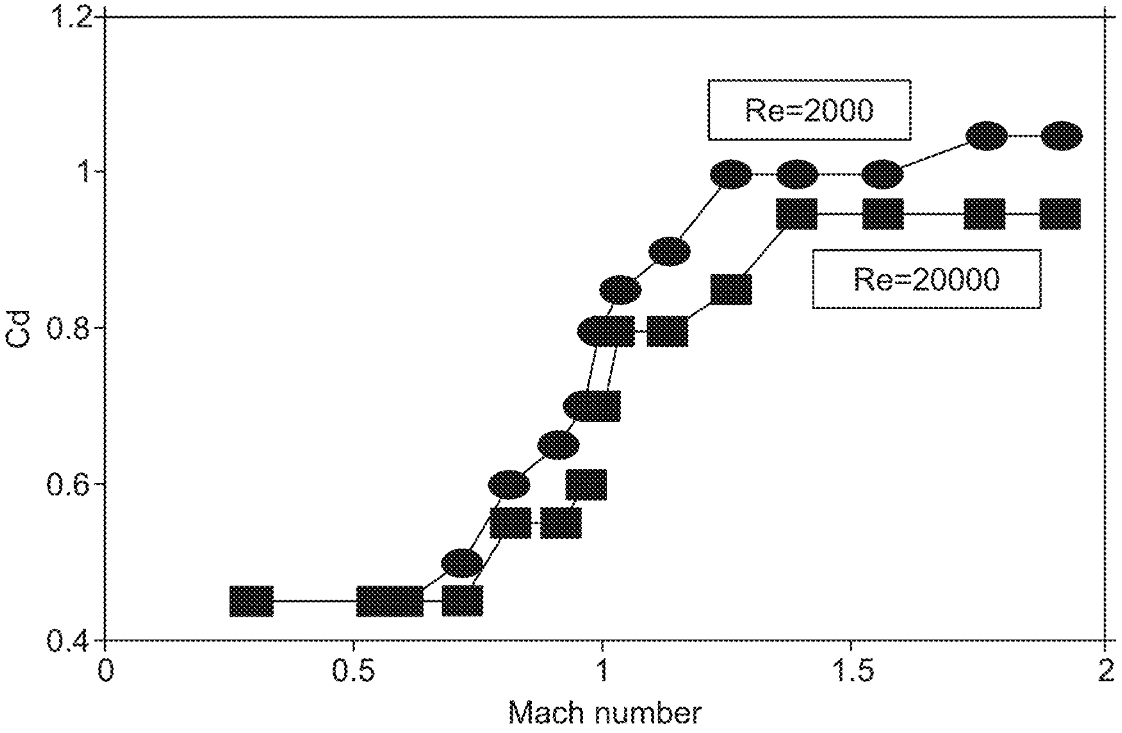
FIG. 4 is a graph showing the drag coefficient as a function of Mach number for two Reynolds numbers for spheres.

The acceleration of particles in a stream can be modeled using empirically determined drag coefficient presented previously (Settles & Geppert, 1997) based on data from Bailey and Hialt. The acceleration of a particle of mass, m, is found from the drag, D, as $$a = \frac{D}{m} = \frac{1}{m}\frac{1}{2}\rho U_{rel}^2 A C_d$$

where A is the cross-sectional area of the sphere and $U_{rel}$ is the relative velocity between the gas and the particle. Illustrated in FIG. 4 is the drag coefficient as a function of Mach number for two Reynolds numbers for spheres.

Previous studies have demonstrated that the noise power, P, of a jet scales with the eighth power of velocity and the square of jet diameter (Powell, 1959) as $$P \propto U^8 D^2$$

Furthermore, sound pressure level, SPL, is proportional to sound power level, SWL where $$SWL = 10\log\left(\frac{\text{Power}}{1\times 10^{-12} W}\right)$$

As a result, it can be inferred that SPL, velocity and diameter scale as:

$$SPL_2 - SPL_1 = 80\log\frac{U_2}{U_1}$$

Figure 5:
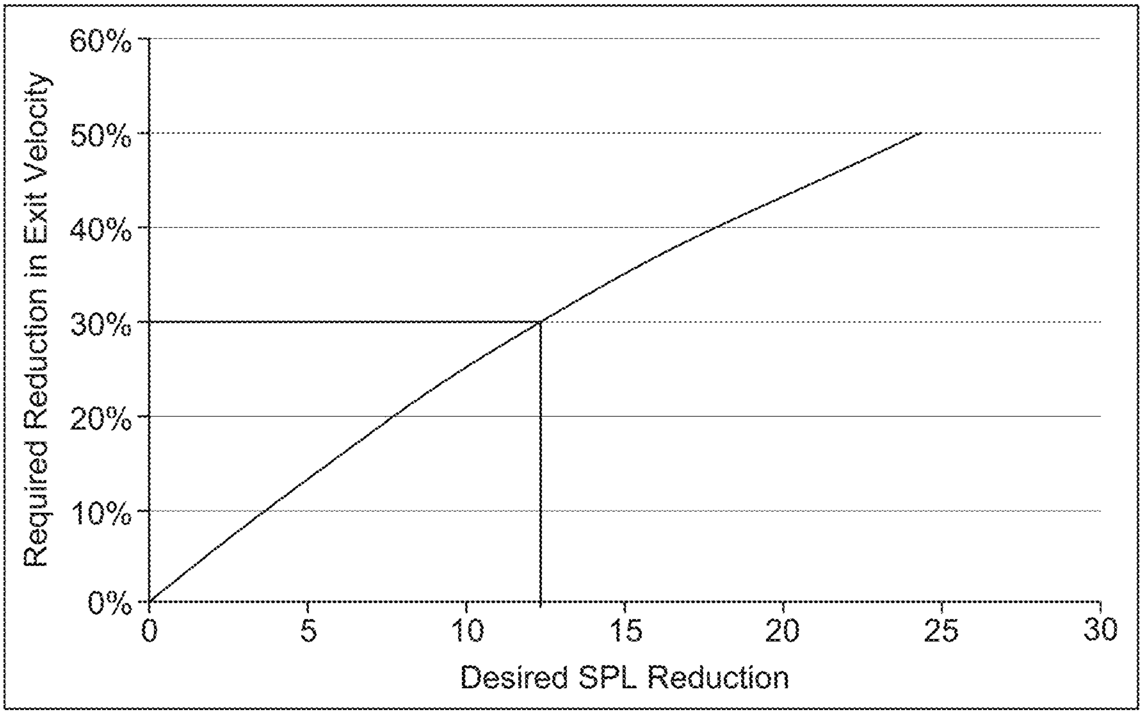
FIG. 5 is a graph showing the required reduction in jet exit velocity to achieve desired reduction in Sound Pressure Level (SPL) based on the relationship of jet exit velocity to jet noise production.

This relationship is shown in graph form in FIG. 5. Thus, if the exit velocity of the nozzle is reduced by 30%, for example, then a drop in SPL of 12.5 dB is expected, while a reduction in exit velocity of 43% would result in an expected drop in SPL of 20 dB.

Figure 1:
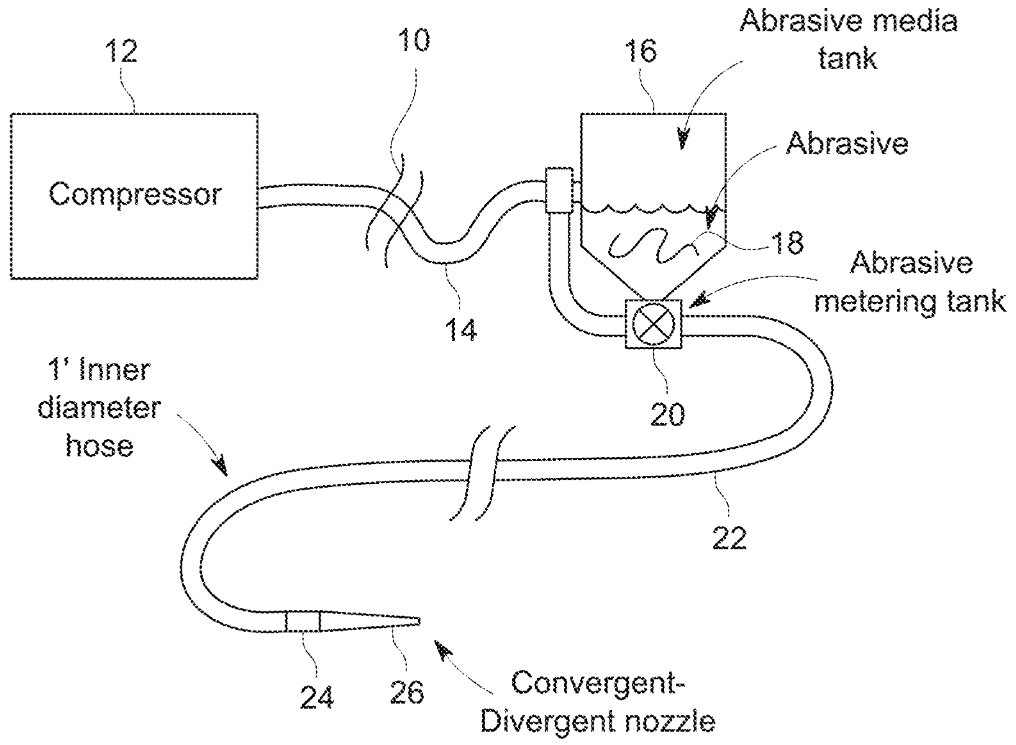
FIG. 1 illustrates a conventional state of the art supersonic abrasive blasting system.
Figure 2:
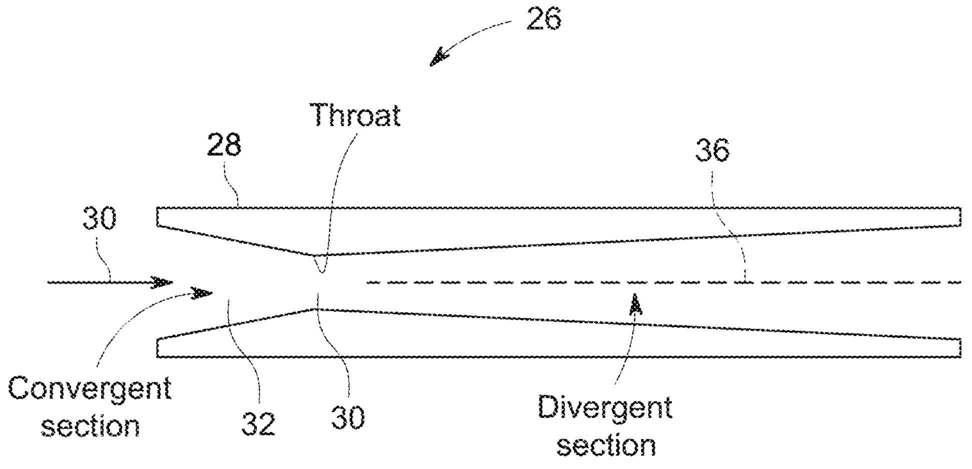
FIG. 2 depicts, in cross section, a conventional state of the art supersonic convergent-divergent nozzle used in the abrasive blasting system illustrated in FIG. 1.
Figure 3:
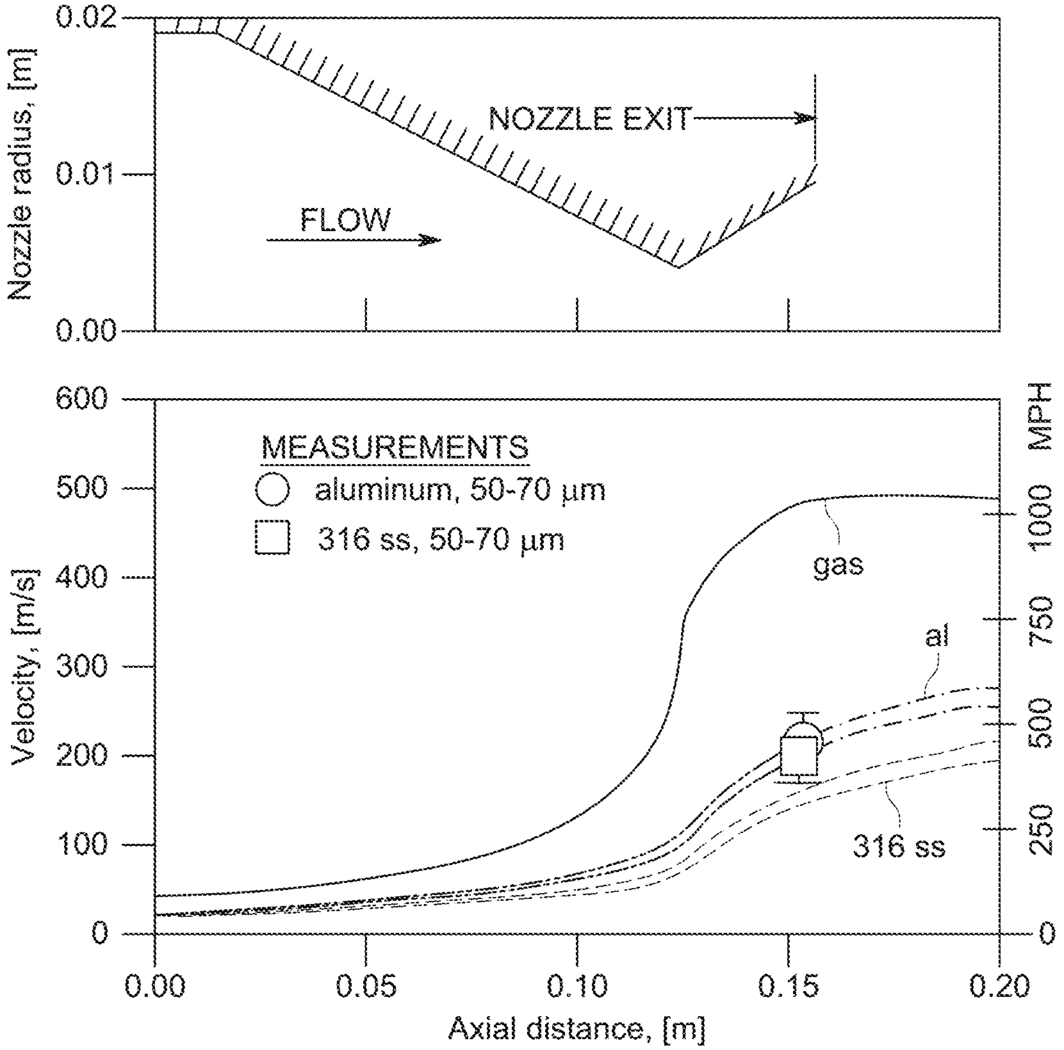
FIG. 3 reproduce graphs from Settles' paper (Settles G., *A scientific view of the productivity of abrasive blasting nozzles,* 1996), showing predicted and measured velocities through a conventional Laval nozzle and the large difference between abrasive velocity and exit gas velocity.

In order to have the same production as a current state of the art nozzle blasting system, the velocity of the particles must be maintained. Conventional nozzles, as illustrated in FIG. 2, have much higher gas velocities than particle velocities, and these high gas velocities are responsible for high sound production levels. The subject invention maintains the particle velocity while decreasing the nozzle exit gas velocity and such, decreasing the sound production. This requires a longer acceleration length relative to conventional art nozzle blasting systems.

The mass of the sphere is the density of the particle, $\rho_{particle}$ multiplied by the volume $4/3\pi r^3$. So acceleration becomes $$a = \frac{3}{8} C_d \frac{\rho_{gas}}{\rho_{particle}} \frac{U_{rel}^2}{r}$$

Figure 6:
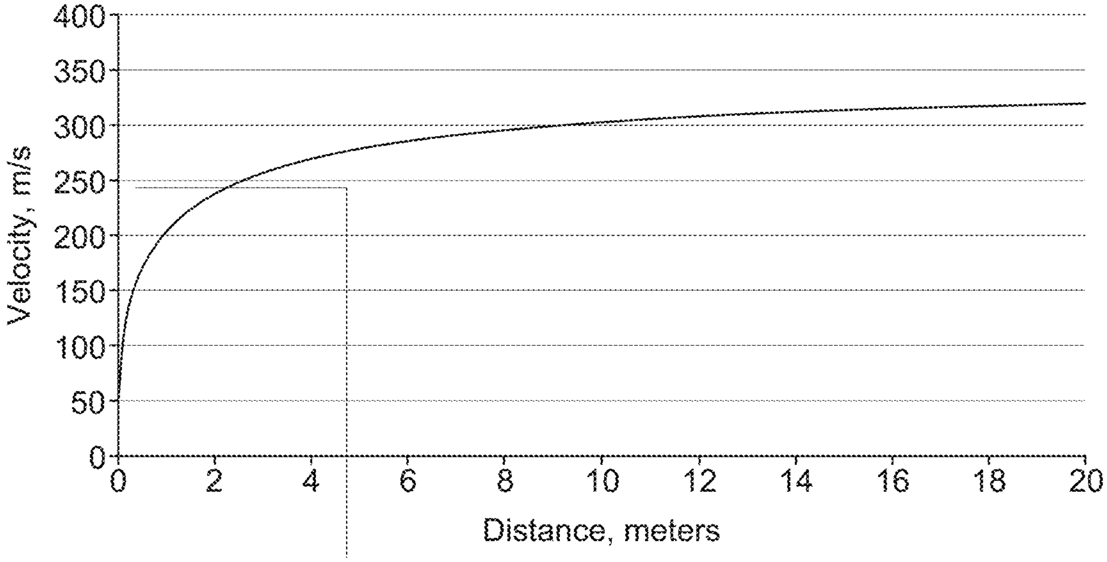
FIG. 6 is a graph demonstrating modeled particle velocity versus distance in 345 m/s accelerator section for Type V acrylic media 20/30 mesh.

The solution can be found in a stepwise manner and is shown in FIG. 6 for Type V acrylic media of 20/30 mesh in an air stream with a velocity of 345 m/s. This demonstrates that to achieve 275 m/s particle velocity a 4 meter accelerator section is required in the hosing.

Based on an estimated exit velocity of 483 m/s from a previous model of the standard #8 nozzle operating at 40 psi pressure, an exit velocity reduction of 30% to 345 m/s (roughly sonic) produced a 12.5 dB reduction in SPL. The length of hose then needs to be sufficiently long to match the particle velocity of the #8 nozzle at 40 psi.

The instant invention achieves sufficient abrasive particle velocity through greater acceleration distances in an airstream with a lower exit velocity, thereby reducing nozzle generated noise experience with supersonic blast nozzles. Adjustments to blasting productivity can be made by adjusting the abrasive mass flow rate.

Figure 7:
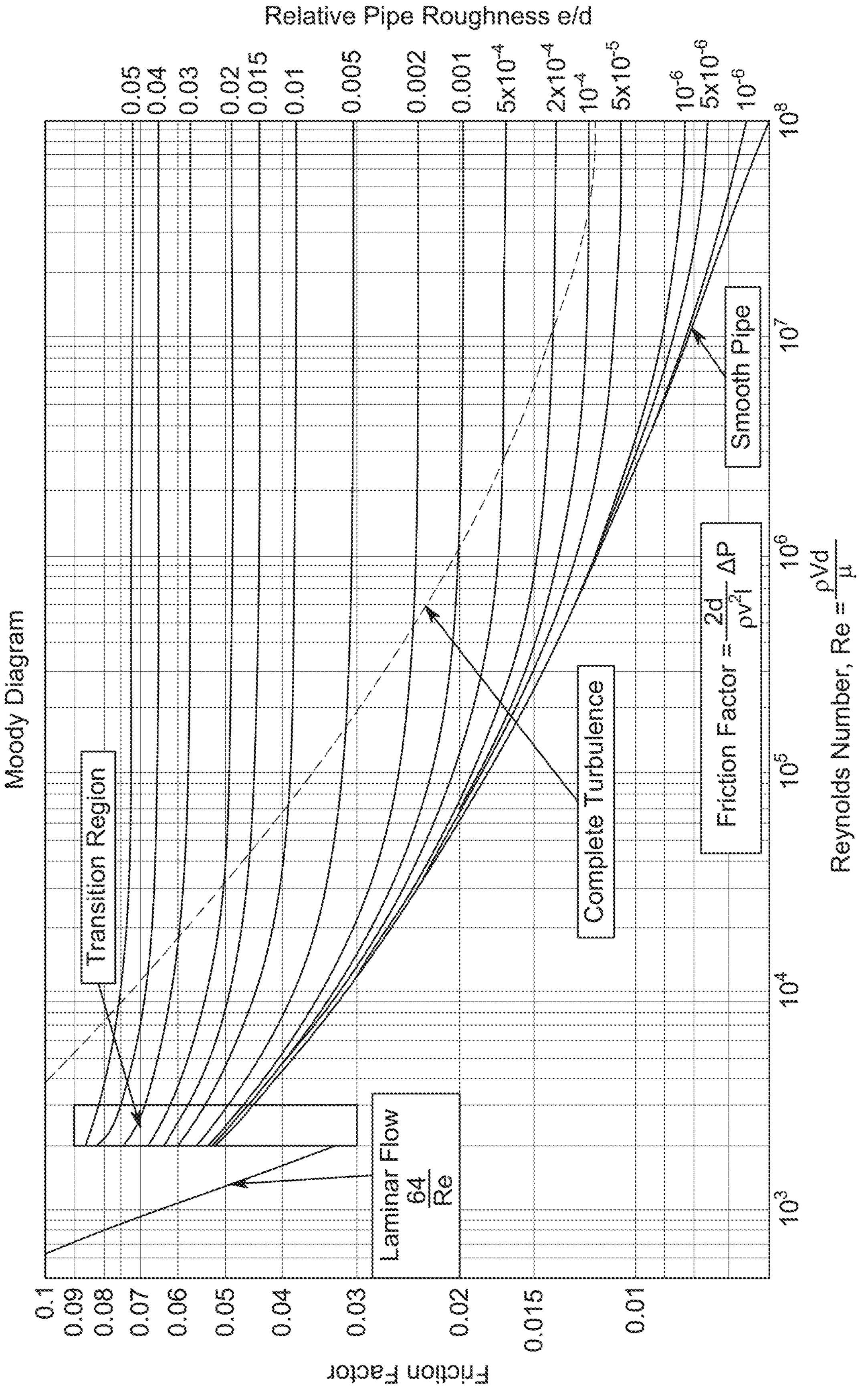
FIG. 7 is a Moody Diagram used for estimation of Friction Factor from Reynolds Number and pipe roughness.

Pressure loss, or head loss, is unavoidable and must be considered. As the length of the hose increases, the pressure will decrease and eventually decrease the flow velocity. But this loss can be calculated. The head loss, or pressure loss, due to friction along a pipe is given by the Darcy-Weisbach equation as $$\Delta p = f_D \frac{L}{D} \frac{\rho V^2}{2}$$

where L is the length of the pipe section, D is the pipe diameter, ρ is the density of the fluid, V is the average fluid velocity, and $f_D$ is the Darcy friction factor based on Reynolds Number, Re and relative pipe roughness, ϵ/d and is equal to approximately 0.02 for plastic/rubber. FIG. 7 shows a Moody Diagram used for estimation of Friction Factor from Reynolds Number and pipe roughness.

A ¾" inner diameter blast hose operating close to "choked" condition has a velocity of 230 to 340 m/s and a Reynolds number of 300,000 to 436,000. Drag over the length of the hose induces pressure losses which decrease the average velocity in the pipe.

Velocity in the hose will be sonic if the choked flow conditions exist where the pressure downstream falls below a critical value, $$\frac{p^*}{p_0} = \left(\frac{2}{k+1}\right)^{\frac{k}{k-1}}$$

where the heat capacity ratio, k, is 1.4 for air, giving $$p^* = 0.528 p_0$$

For 40 psi gage pressure, or 54.7 psi absolute pressure, p* is 28.9 psia or 14.2 psig.

Based on the results of analytical models discussed above, a preferred embodiment of the subject invention was designed that takes airborne particles from the example 1" hose and accelerates them through a smaller diameter hose a sufficient distance such that a productive particle speed is obtained. Transition couplings that step down the inside diameter of the hose provide smooth transitions between the different hose section diameters with minimal pressure losses.

Figure 8:
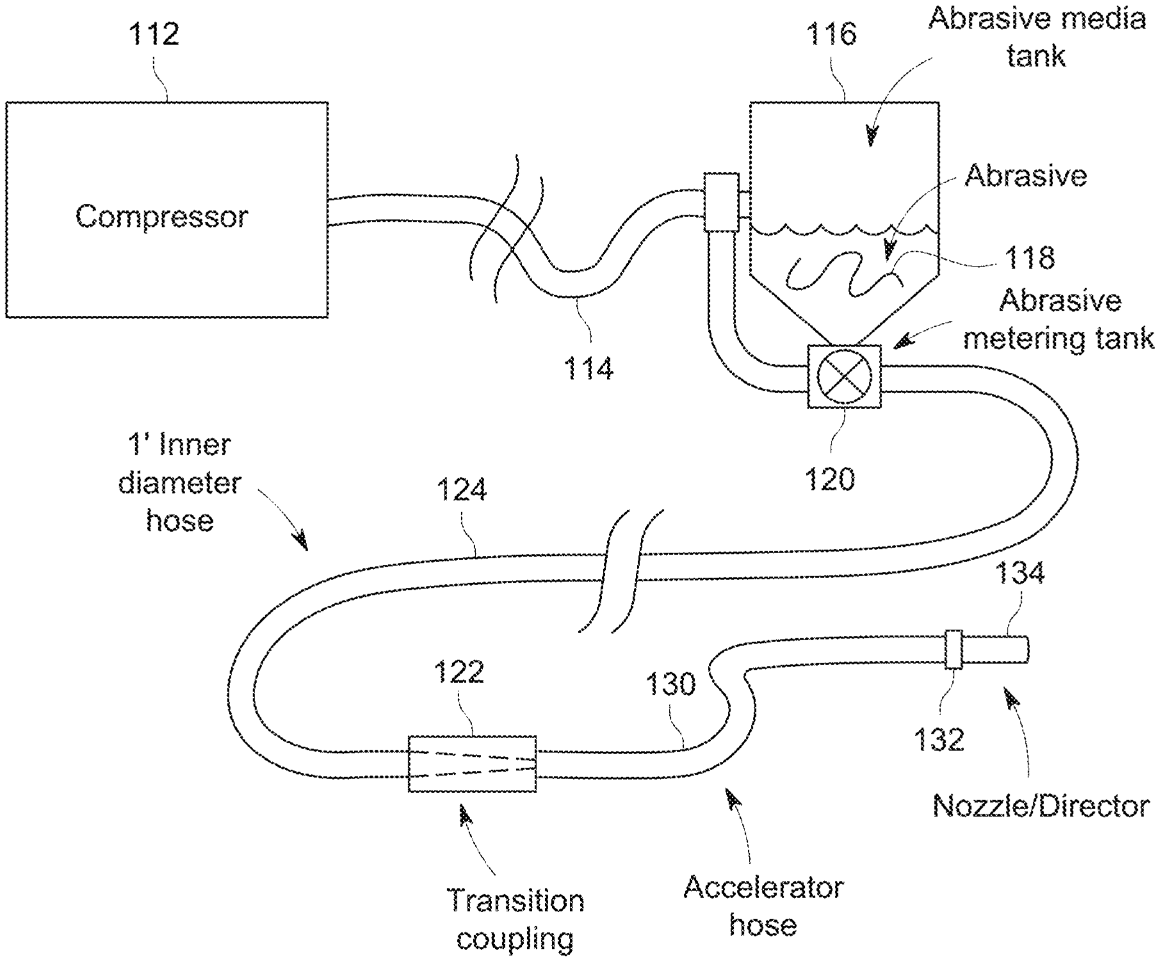
FIG. 8 illustrates an improved reduced noise abrasive blasting system, according to an embodiment of the subject invention.

According to a preferred embodiment of the reduced noise abrasive blasting systems of the subject invention depicted in FIG. 8, compressor 112 pressurizes gas to near 120 psi. Compressed gas is pumped through initial hose section 114 into abrasive media tank 116 containing abrasive media 118. An abrasive metering valve 120 controls the rate of release of abrasive media 118. A standard 1" inside diameter blast hose 124 attaches, at one end to metering valve 120 and, at the other end, to a transition coupling 122. A length of reduced inside diameter, ¾" for example, accelerator hose 130 connects transition coupling 122 to a nozzle 134 through a claw coupling 132. Transition coupling 122 serves to step down the inside diameter of the path that is taken by abrasive media 118 from the 1" diameter blast hose 124 to the smaller diameter acceleration hose 130.

Figure 9:
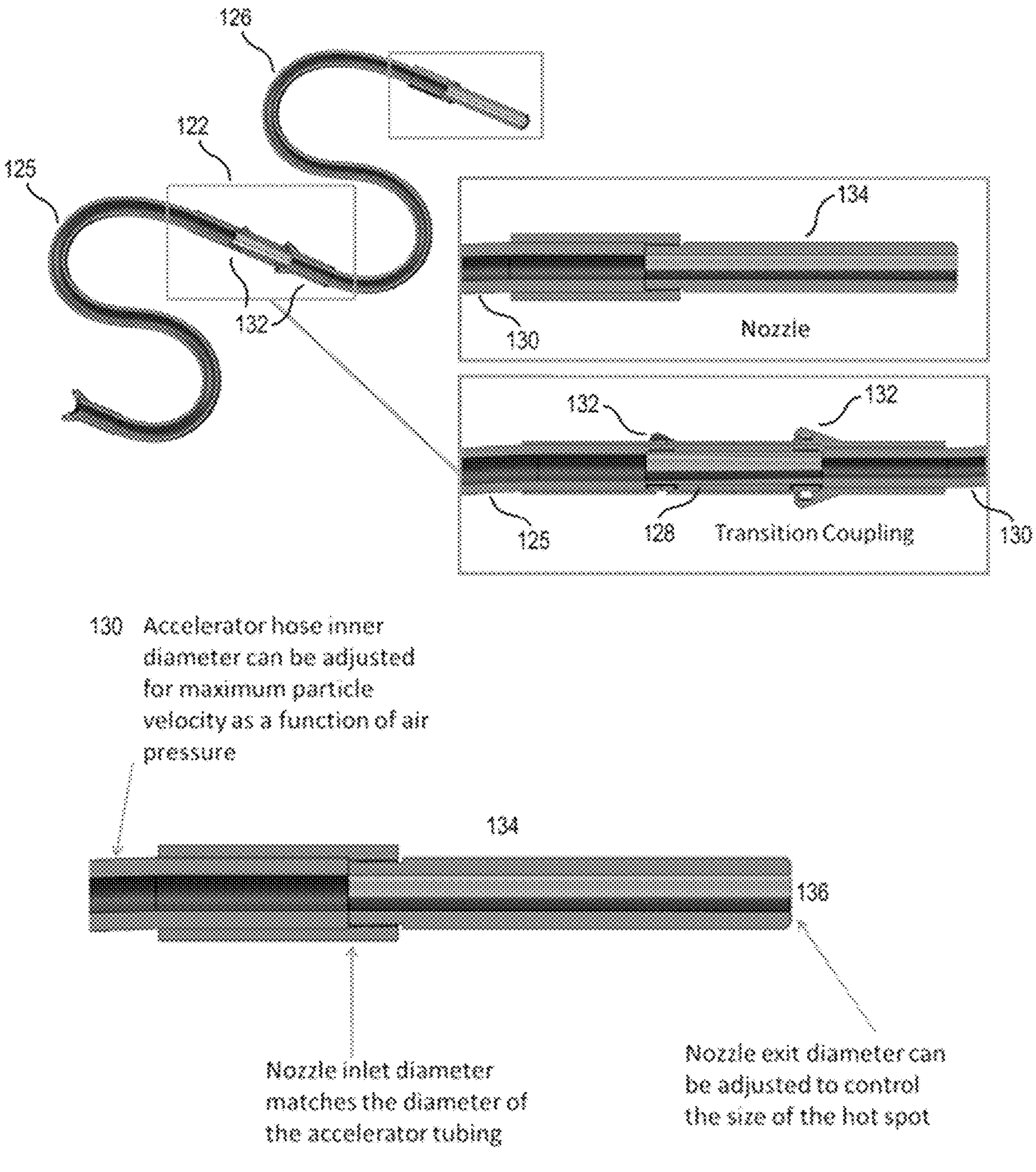
FIG. 9 shows, in cross-section, details of the transition coupling used to step down the inside diameter of the abrasive media path employed in the reduced noise abrasive blasting system illustrated in FIG. 8 and the relative geometry of the nozzle and accelerator hose.

The details of transition coupling 122, and nozzle 134, are illustrated, in cross-section, in FIG. 9. Coupling 122 is comprised of housing 128 enclosing a bore (not shown). The blast hose side 125 of transition coupling 122 has a 1" inside diameter bore, while the accelerator side 130 of transition coupling 122 has a ¾" diameter bore. Each side of transition coupling 122 connects with the respective hose using conventional claw coupling 132 technology.

The nozzle 134 exit diameter 136 is sized to control the desired abrasive "hot spot" diameter such that the effective blasting region of the reduced noise abrasive blasting system can match that of a conventional supersonic nozzle.

Other preferred embodiments of the reduced noise abrasive blasting systems of the present invention are systems that comprise more than one section of acceleration hose and that employ more than one transition coupling, each section of acceleration hose having a decreasing inside diameter. Other types of couplings, nozzles, metering valves and abrasive media may be employed in the systems of the instant invention without departing from the scope of the invention.

More detail is given below on how to design a nozzle, according to the present invention in its various embodiments, for a configuration that utilizes a convergent section followed by a throat section followed by a divergent section followed by a straight section. One-dimensional supersonic flow in a pipe with friction can be represented by the following equation where $x_1$ and $x_2$ are the locations of interest and $M_1$ and $M_2$ correspond to the local Mach numbers at these locations. D is the diameter of the pipe, f is the friction coefficient, and γ is the specific heat ratio:

$$\int_{x_1}^{x_2} \frac{4f\,dx}{D} = \left[-\frac{1}{\gamma M^2} - \frac{\gamma+1}{2\gamma}\ln\left(\frac{M^2}{1+\frac{\gamma-1}{2}M^2}\right)\right]_{M_1}^{M_2}$$

where wall shear stress, τ, is related to the friction coefficient by $$\tau = \tfrac{1}{2}\rho u^2 f$$

If L* is defined as the length position in the pipe where the Mach number is reduced to 1 through friction, then the well-known relation below results:

$$\frac{4\bar{f}L^*}{D} = \frac{1-M^2}{\gamma M^2} + \frac{\gamma+1}{2\gamma}\ln\left[\frac{(\gamma+1)M^2}{2+(\gamma-1)M^2}\right]$$

where the average friction factor is defined as:

$$\bar{f} = \frac{1}{L^*}\int_0^{L^*} f\,dx$$

The local temperature, static pressure, density, and total pressure relative to that at the sonic throat are given by the following equations, respectively:

$$\frac{T}{T^*} = \frac{\gamma+1}{2+(\gamma-1)M^2}$$

$$\frac{p}{p^*} = \frac{1}{M}\left[\frac{\gamma+1}{2+(\gamma-1)M^2}\right]^{\frac{1}{2}}$$

$$\frac{\rho}{\rho^*} = \frac{1}{M}\left[\frac{2+(\gamma-1)M^2}{\gamma+1}\right]^{\frac{1}{2}}$$

$$\frac{p_0}{p_0^*} = \frac{1}{M}\left[\frac{2+(\gamma-1)M^2}{\gamma+1}\right]^{(\gamma+1)/[2(\gamma-1)]}$$

To produce a noise-reduced version of a conventional nozzle, one can examine the conventional exit area to throat area ratio, which is the square of the ratio of exit to throat diameters $A_e/A^*=(D_e/D^*)^2$. This area ratio then determines the Mach number at the end of the divergent section from the well-known area Mach number relation:

$$\left(\frac{A}{A^*}\right)^2 = \frac{1}{M^2}\left[\frac{2}{\gamma+1}\left(1+\frac{\gamma-1}{2}M^2\right)\right]^{(\gamma+1)/(\gamma-1)}$$

The exit Mach number of the convergent section, $M_e$, is then used with friction factor of the pipe wall and the equation for determining the length of pipe required to reduce the Mach number to 1 inside the pipe. This length, L*, is then the length of straight section required for a nozzle without any abrasive media to produce a Mach number of 1 at the exit. Any length beyond this will result in a normal shock wave at the exit. As normal shock waves have subsonic flow downstream of the shock wave, the flow velocity, and thus the sound produced by flow, are dramatically reduced.

Rearranging the equation from before to solve for L* produces the following:

$$L^* = \frac{D}{4\bar{f}}\left[\frac{1-M^2}{\gamma M^2} + \frac{\gamma+1}{2\gamma}\ln\left(\frac{(\gamma+1)M^2}{2+(\gamma-1)M^2}\right)\right]$$

Abrasive blasting nozzles utilize some type of abrasive which is accelerated in the nozzle as it moves toward the exit. As the abrasive particles are accelerated, energy transfers from the flow to the particles. The effect of adding abrasive to the flow is similar to increasing the friction factor of the straight section and thus reduces the required length to achieve a normal shock wave at, or just before, the exit. In general, the more abrasives added to the flow, the shorter the length of the straight pipe section required to achieve a normal shock wave at, or just before, the exit. A more detailed estimate of the effect of abrasives can be calculated starting with the force of drag from one abrasive particle, $$F_{particle\ drag} = \tfrac{1}{8}\pi\rho_{gas}U_{rel}^2C_d d_{particle}^2$$

where $U_{rel}$ is the relative velocity of the air/gas stream to the particle speed and $d_{particle}$ is the diameter of the abrasive particle. The number of particles in a particular volume, $n_p$, can be used to calculate the total force on the flow over that volume from:

$$F_{volume} = n_p F_{particle\ drag}$$

While a more precise calculation would include for the variation across the volume, average values can be used for an approximate calculation. The value for $n_p$ in the straight section of length L can be approximated from the following;

$$n_p = \frac{Q_{abs} * (\pi D^2 L/4)}{Q_{air} m_p}$$

where $Q_{abs}$ is the mass rate of abrasives consumption, $Q_{air}$ is the volumetric rate of air flow, D is the diameter of the straight section, L is the length of the straight section and $m_p$ is the abrasive particle mass. Particle mass may be calculated from the following:

$$m_p = \rho_{abs}\frac{4}{3}\pi\frac{d_p^3}{8}$$

Then $$F_{volume} = \frac{3\pi}{16}\rho_{gas}U_{rel}^2C_d\frac{Q_{abs}}{Q_{air}\rho_{abs}}\frac{D^2L}{d_p}$$

From this value for drag force on a volume, for example, the volume of the straight section of the quieted nozzle, the equivalent additional force on the fluid from the abrasives as a function of the wall area may be calculated from:

$$\tau_{abrasives} = \frac{F_{volume}}{\pi\frac{D^2}{4}}$$

While this is not a shear force, the same notation as a shear force is used since the force on the fluid volume is divided by the wall area and not the flow cross-sectional area so that it can eventually be incorporated into the equation for L*.

$$f_{abrasives} = \frac{\tau_{abrasives}}{\frac{1}{2}\rho_{gas}u^2} = \frac{3}{2}\frac{U_{rel}^2}{u^2}C_d\frac{Q_{abs}}{Q_{air}\rho_{particle}}\frac{L}{d_{particle}}$$

Then one can compute an approximate length at which the Mach number becomes 1 based on the following equation where M refers to the Mach number at the beginning of the straight section:

$$L^* = \frac{D}{4(\bar{f}+f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

This length is then considered the minimum length of the straight section following the divergent section which follows the throat, which follows the convergent section. This length assumes that the exit pressure is equal to the back pressure, or the pressure after the exit. Deviation from this assumption will cause the shock to move outward in the case of straight section exit pressure being greater than back pressure, or inward in the case of the straight section exit pressure being less than the back pressure. These deviations can be quantified using known methods based on pressure at the entrance of the nozzle, ratio of nozzle throat area to the nozzle exit area, and back pressure (which is generally local atmospheric pressure). In general, the exit pressure is a function of the pressure upstream of the throat and the ratio of the exit area of the divergent section to the area of the throat, where the flow is sonic, i.e. Mach of 1. Therefore, control of the upstream pressure, at the entrance to the convergent section, controls the exit pressure.

The reduced noise abrasive blasting nozzle may also take the form of a standard nozzle with an attachment that connects to the end via threads or clamp or other known securing method or device. Any of the properties described herein for the straight portion of a reduced noise abrasive blasting nozzle thus may apply to the straight portion of such an attachment, and vice versa. For standard nozzles that lack threads at the exit of the diverging portion, threads may be machined into the diverging portion to mate with threads on the attachment (or a securing device), or a clamp or other securing device may be used. Many different types of clamps are well known for the purpose of connecting adjacent tubular objects. Such attachments in embodiments are identical to the "straight portions" of the nozzles described herein, except for being separable from other components of the nozzle. In this way, standard nozzles may be reconfigured into quiet reduced noise abrasive blasting nozzles. These attachments and methods to determine the dimensions of these attachments follow the same design principles and procedures as already outlined herein. The attachments may be provided alone and/or with a securing device, for ready application in retrofitting existing standard nozzles, or may be provided along with the rest of the nozzle and optionally a securing device. The rest of the nozzle may be a standard nozzle, or may be a custom nozzle or standard nozzle that has been specially adapted for removably securing the attachment to the diverging portion of the nozzle, for example by putting threads on the end of the diverging portion. The attachment and the diverging portion of the nozzle may have various known securing structures built in to assist with removably securing the attachment to the diverging portion. In embodiments, a variety of attachments may be provided (with or without the rest of the nozzle) for use with a variety of corresponding gas/abrasive particle mixes and/or pressures.

EXAMPLES

Initial Prototype Fabrication and Testing

Figure 10:
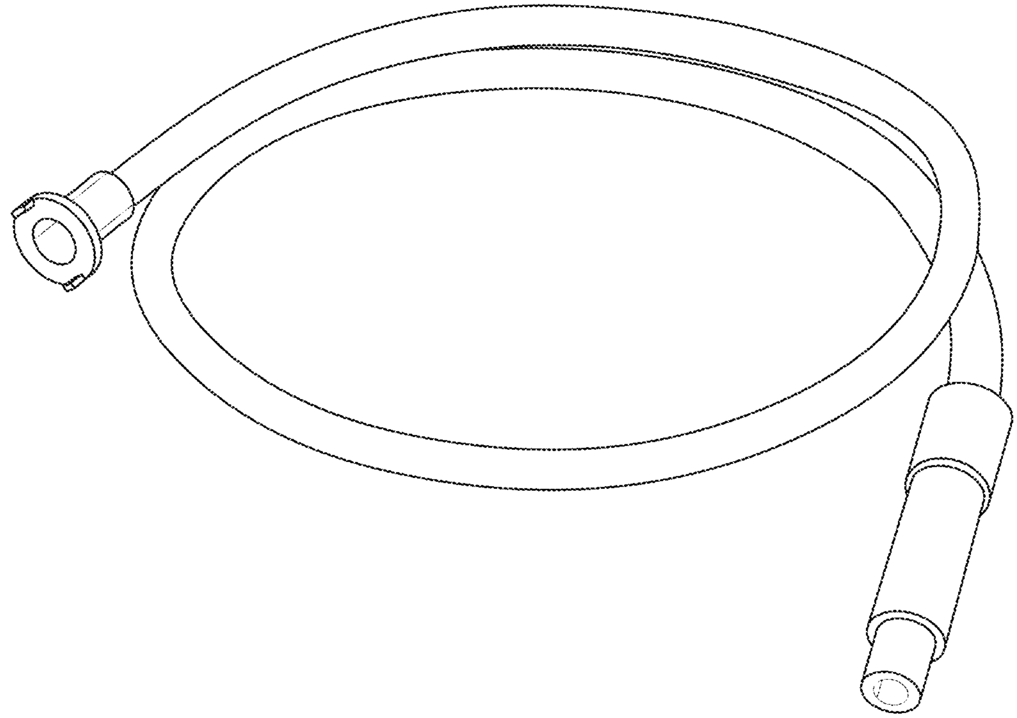
FIG. 10 is a photograph of a prototype reduced noise abrasive blasting accelerator hose and nozzle, according to an embodiment of the subject invention.

A prototype comprising the component parts illustrated in FIGS. 8 and 9 was fabricated as shown in FIG. 10 with the following characteristics for testing:

- Four-meter accelerator section with ¾" inner diameter to achieve sonic conditions (345 m/s)
- Straight bore nozzle with 0.79 bore diameter to match output diameter of #8 nozzle to achieve same "hot spot" as current standard #8 setup
- Couplers, etc.

Sound pressure levels were measured using both handheld integrating sound pressure meter and a stand-alone microphone data acquisition system. Nozzle pressures were measured near the end of the 1" hose before coupler to be 40 psi. Type V media was introduced by opening the media valve 4 full turns. Results of the sound pressure level testing, in dB, were as follows:

| Nozzle | Integrated SPL (dB) |
|---|---|
| Standard #8 | 108 |
| QB-1 Prototype | 94.5 |

Figure 11:
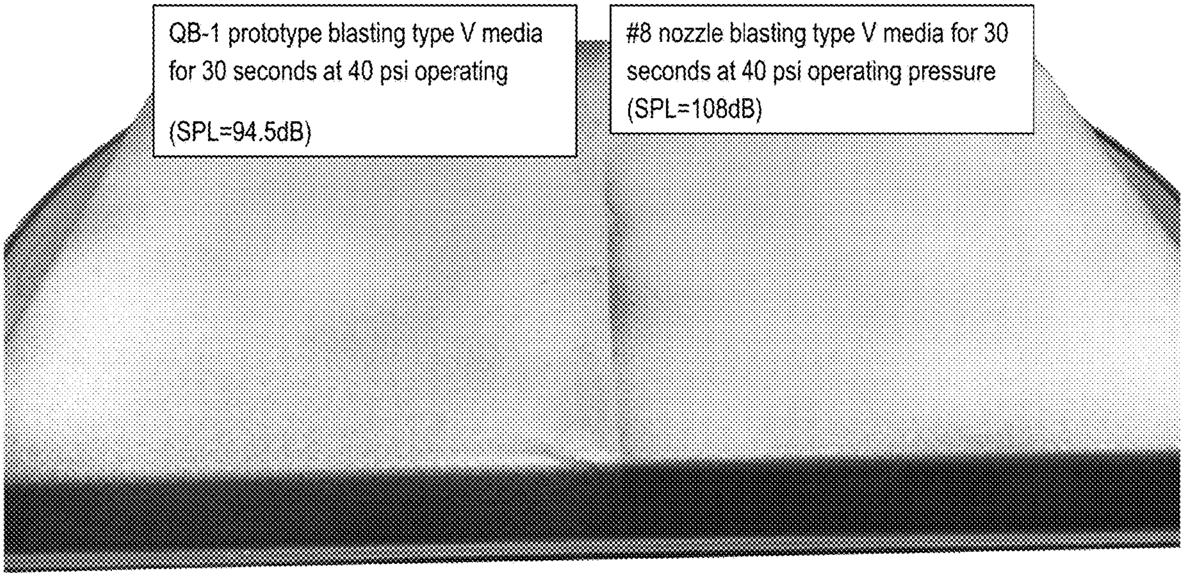
FIG. 11 is a photograph illustrating, in comparative format, productivity of a reduced noise abrasive blasting nozzle, according to an embodiment of the subject invention (left side) and conventional blasting (right side) using #8 nozzle blasting Type V media on half of an exposed coated baking pan for 30 seconds, both with 4 turns of abrasive metering valve knob.

Productivity was qualitatively assessed by using both the #8 nozzle and the subject prototype for 30 seconds on an exposed half of a coated baking pan, as illustrated in FIG. 11. The effect of adjusting the abrasive metering valve knob was examined by adjusting the knob to six turns for the prototype and comparing the production of that setup to a standard #8 nozzle that used the 4-turn setting.

Figure 12:
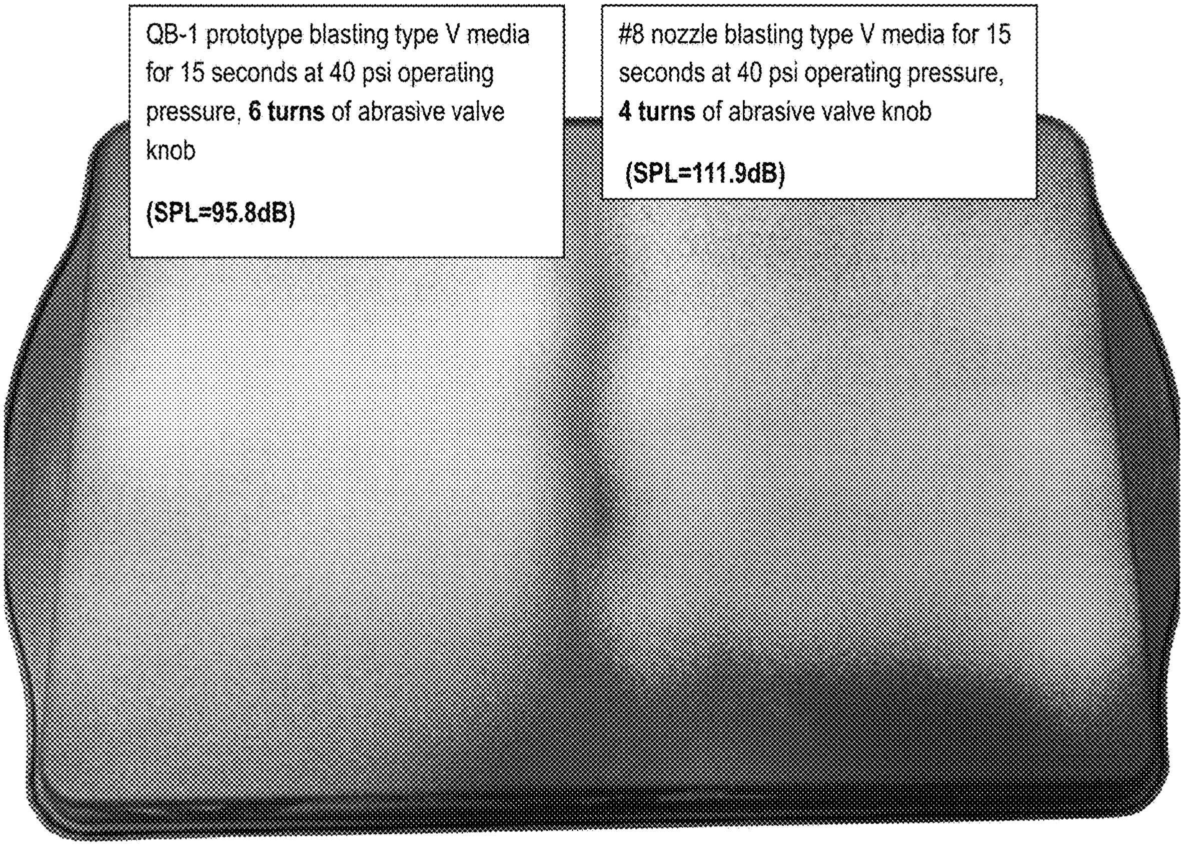
FIG. 12 is a photograph comparing the results of using a reduced noise blasting system, according to an embodiment of the subject invention, operating with additional abrasive to a conventional system operating with a standard #8 nozzle.

FIG. 12 illustrates that the prototype operating at the 6-turn setting was clearly more productive than the standard #8 operating at the 4-turn setting. These results show that the subject invention can be operated with equal or better productivity compared to a standard #8 nozzle while producing 16 dB less noise as measured at the operator.

Figure 13:
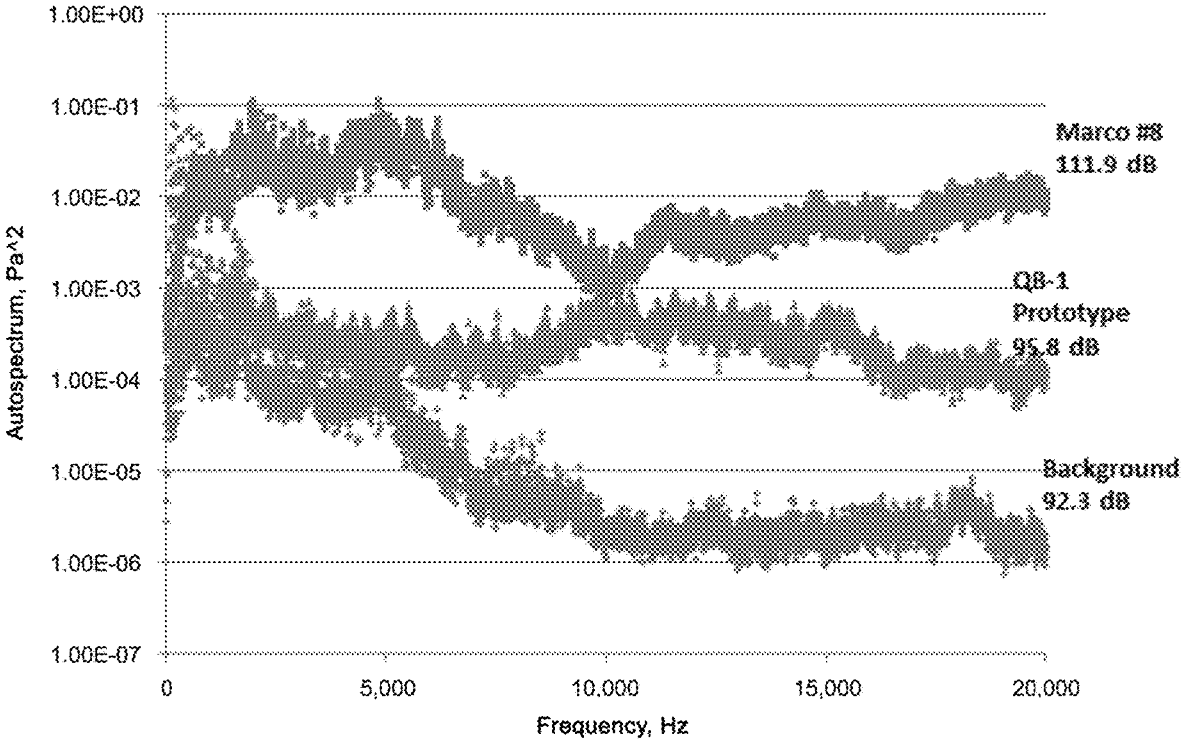
FIG. 13 is an autospectrum of a conventional state of the art supersonic abrasive blasting apparatus with a standard #8 nozzle and the subject invention prototype with Type V media and 40 psi operating pressure, along with background noise levels from blasting compressor unit.

Testing was also performed to examine total sound pressure levels as well as acoustic spectra for the prototype as compared to a standard #8 nozzle, both operating at 40 psi. The testing results demonstrate noise reduction is broad spectrum, as illustrated in FIG. 13.

Other preferred embodiments of the reduced noise abrasive blasting systems of the present invention are systems that employ a new nozzle having a straight section following a diverging section, to accelerate the media particles to a desired velocity prior to the particles exiting the blast nozzle. Such low noise abrasive blasting nozzles are suitable to replace nozzles such as the standard #6 nozzle with improved blasting productivity and reduced noise production. The exit shock condition of the new nozzles is designed to dramatically reduce jet noise from flow exiting the nozzle. Comparative testing between a new nozzle and an existing commercial nozzle achieved 17 dB(A) noise reduction while showing improvement in productivity in tests with garnet. CFD modeling shows an improved particle acceleration zone. Further, evaluation shows improved productivity and reduced noise with steel shot using a new nozzle versus a standard #6 nozzle, with improved productivity, reduced acoustic noise, and reduced handling fatigue.

Figure 14A:
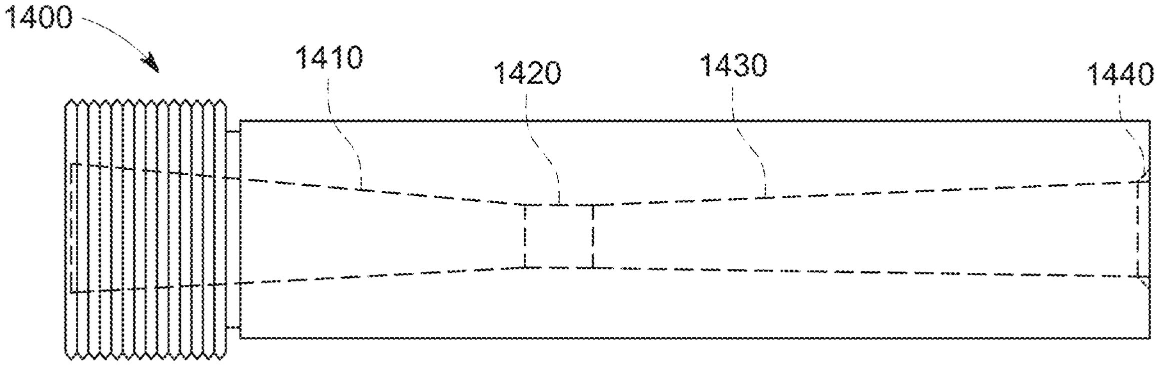
FIG. 14A-B are side and perspective see-through views, respectively, of a standard #6 nozzle.
Figure 14B:
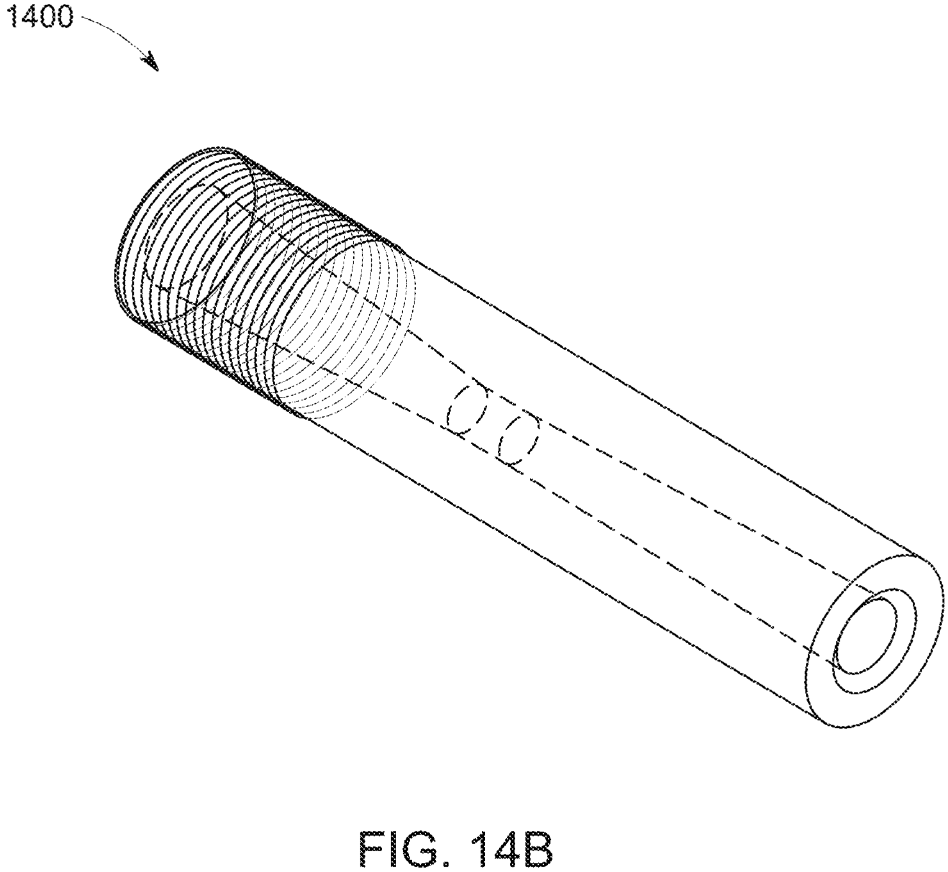
Figure 15:
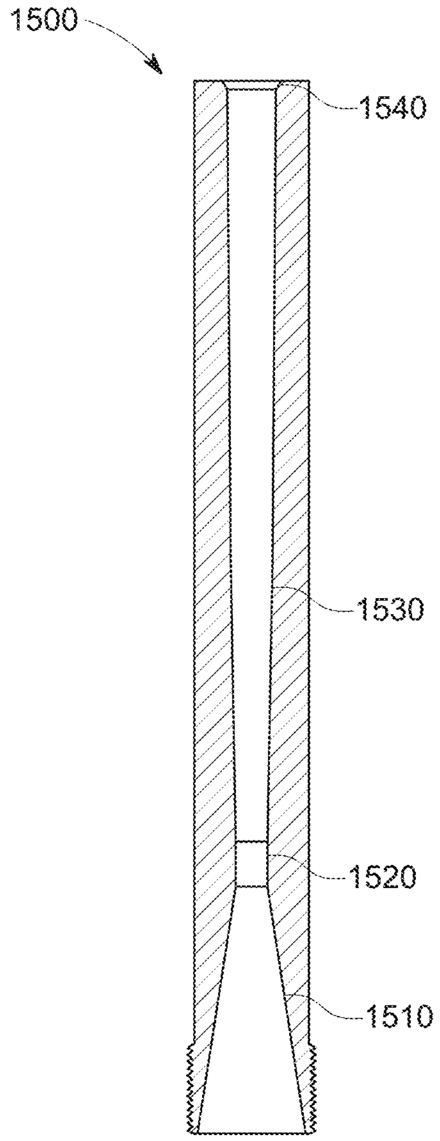
FIG. 15 is a sectional view of an XL #6 nozzle.

FIG. 14A-B are side and perspective see-through views, respectively, of a standard #6 nozzle 1400. The total length of the nozzle depicted is 6.53", with a converging section 1410 2.80" in length, a throat 1420 0.50" in length, and a diverging section 1430 3.13" in length, a 1.25" inner diameter opening, a 0.38" diameter throat, and a 0.55" diameter exit. The exit portion 1440 is 0.10" in length and also diverging. A nozzle is the standard for abrasive blasting operations. Conventional nozzles are convergent/divergent nozzles such as the standard #6. The particular version shown has a wide entry which is meant to enhance particle distribution homogeneity. It has a converging section at the inlet, a straight throat section of 6/16-inch diameter (thus the #6 designation) and then a diverging section that continues to the exit. The peak velocity of this design occurs at the exit (and beyond). FIG. 15 is a sectional view of an XL #6 nozzle 1500, which has a total length of 11.71 inches as depicted and a longer diverging section 1530 than the standard #6 nozzle shown in FIGS. 14A-B (8.31" instead of 3.13"). The converging section 1510, throat 1520, and exit 1540 are identical.

Figure 16A:
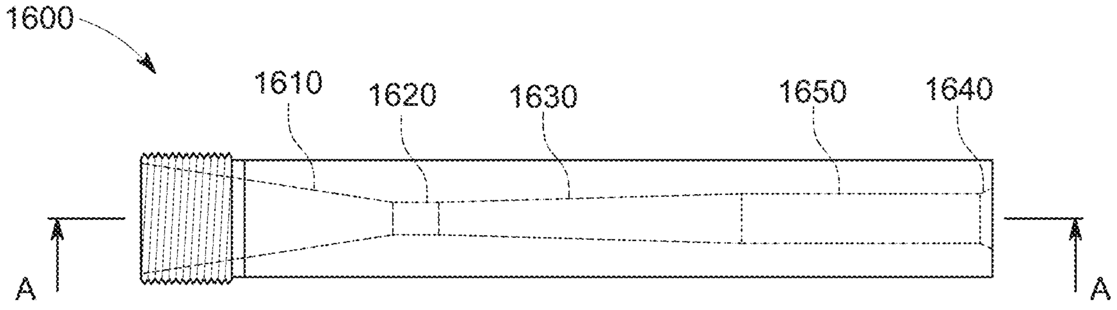
FIGS. 16A-B are a side see-through (FIG. 16A) and sectional view (FIG. 16B) of an improved blast nozzle, according to an embodiment of the present invention.
Figure 16B:
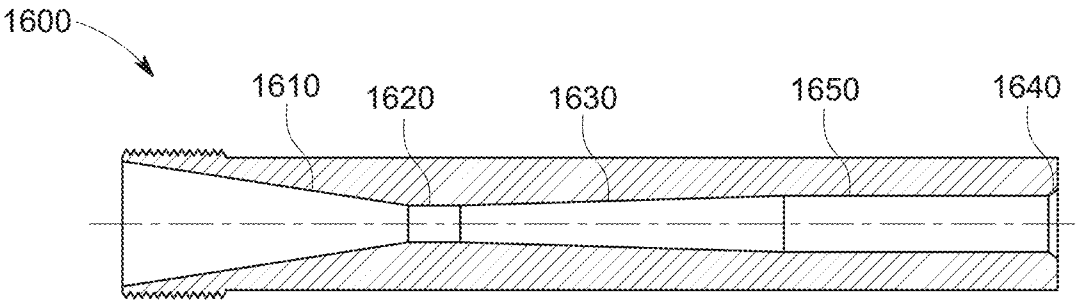
Figure 17A:
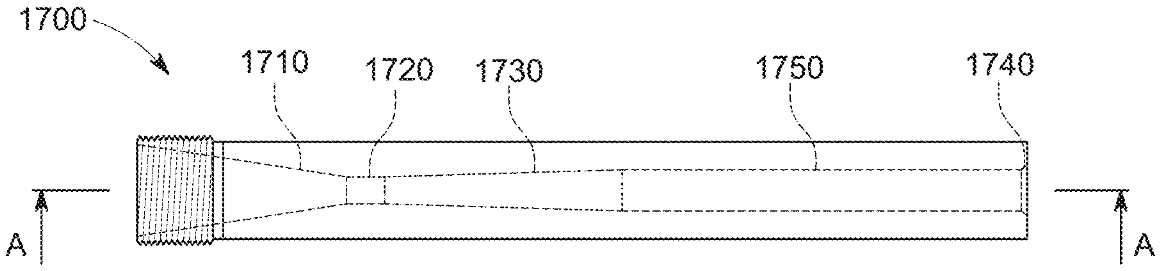
FIGS. 17A-B are a side see-through (FIG. 17A) and sectional view (FIG. 17B) of an extended length improved blast nozzle, according to an embodiment of the present invention.
Figure 17B:
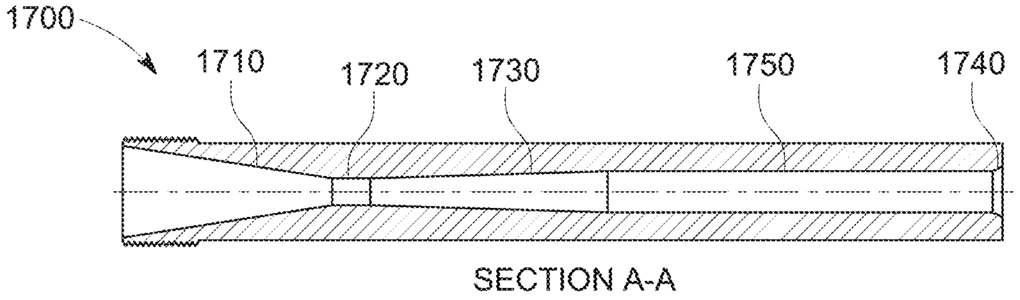

FIGS. 16A-B are a side see-through and sectional view, respectively, of an improved blast nozzle 1600, according to an embodiment of the present invention. The total length of the nozzle shown is 9.07", with a 0.50" long throat 1620, 3.13" long diverging section 1630, and 2.56" long straight section 1650, with converging portion 1610 making up the remaining length. The inner diameter of the opening is 1.25" the diameter of the throat is 0.375" and the diameter of the straight section is 0.55". The converging angle is 8.88 degrees and the angle of the diverging exit portion 1640 is 50 degrees. FIGS. 17A-B is a side see-through and sectional view, respectively, of an extended length improved blast nozzle 1700, according to an embodiment of the present invention, with converging portion 1710, throat 1720, diverging portion 1730, straight portion 1750 and exit portion 1740. This nozzle 1700 has a longer straight section 1750 than the nozzle 1600 shown in FIGS. 16A-B and is similar in overall length to the XL #6 nozzle shown in FIG. 15, with a total length of 11.71". The dimensions are identical to those of the nozzle 1600 depicted in FIGS. 16A-B except that the straight portion 1750 is 5.20" in length.

As the sound production from the air exiting the nozzle is very dependent on the air speed, a design that has a lower air exit velocity without reducing the velocity of the abrasive particles allows for equal or greater productivity while greatly reducing sound volume. The new nozzles that apply this approach add a straight section (neither converging nor diverging) to the end of a conventional nozzle design's diverging section. This extends the particle accelerating section while reducing the exit Mach number as energy is transferred from the air to the particles. The extension of the accelerating section is based on the maximum Mach number being achieved at the end of the diverging section. In various embodiments, the length of this straight section ranges from ⅕ of the nozzle throat diameter to ten times the nozzle throat diameter, but can also extend to 10 times the straight section diameter. The added interaction distance between the slower abrasives in the flow and the air slows down the air in a similar way as wall friction, more efficiently accelerating the abrasive particles while reducing the nozzle exit velocity.

Figure 18:
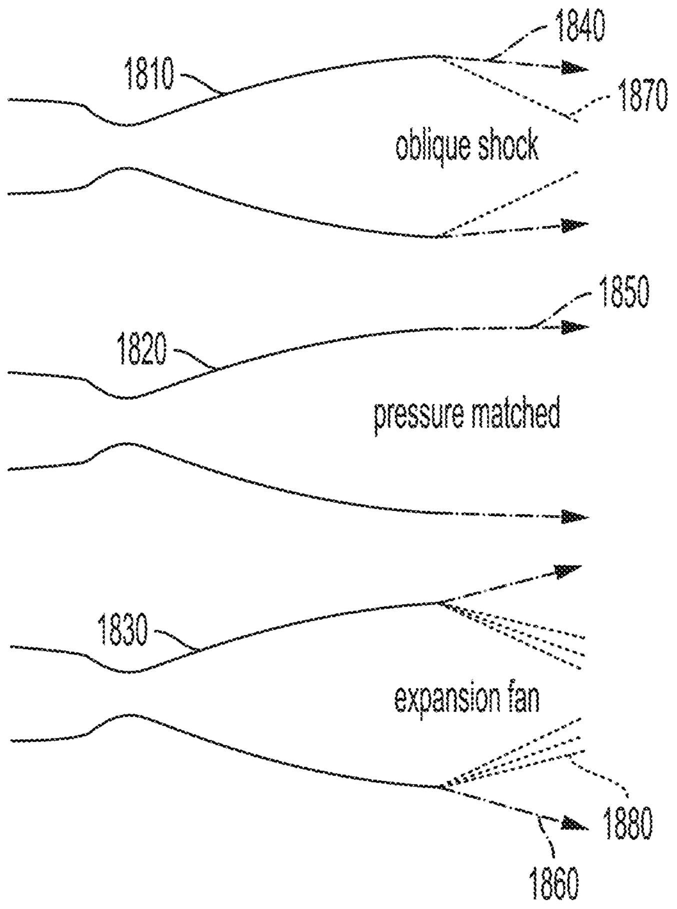
FIG. 18 is a schematic illustrating convergent-divergent nozzle expansion.

FIG. 18 is a schematic illustrating convergent-divergent nozzle expansion in overexpanded 1810, fully expanded 1820, and underexpanded 1830 conditions. Conventional abrasive blasting nozzles are operated in general at what is considered an overexpanded condition, meaning that the flow passes through an oblique shock 1870 as it exhausts and contracts 1840 after the nozzle exit. Flow is supersonic throughout the divergent portion of the nozzle and at the exit, and the jet pressure adjusts to the atmospheric pressure by means of oblique shock waves 1840 outside the exit plane. In contrast, fully expanded flow 1850 does not expand or contract after exit, while underexpanded flow expands 1860 after the exit with expansion fans 1880.

Considering a #6 nozzle, a fully expanded nozzle with an exit-to-throat area ratio of A/A*=2.15 would be driven by a 183 psi pressure reservoir and achieve an exit Mach number of 2.3. Reducing the reservoir pressure can, under the right circumstances, induce a normal shock at the exit plane of a nozzle, substantially reducing the velocity of the gas as it exits the nozzle. However, reducing the reservoir pressure of a conventional abrasive blasting nozzle reduces the particle velocity and renders such a setup impractical. However, the effect of blasting media on the supersonic flow structure leads to normal shock formation at higher than expected reservoir pressures when the supersonic section is uniformly extended. A long high Mach number nozzle section followed by a normal shock at the nozzle exit reduces the exit speed of the air and thus the acoustic noise generation. This has the same effect as running an abrasive-free nozzle at a low enough pressure to produce a normal shock wave at the exit. Having a normal shock wave at the exit drastically reduces the air exit velocity with little effect on the net abrasive velocity. The straight cylindrical section also causes some frictional losses just from wall surface roughness, which results in a slightly lower Mach number toward the end of the nozzle. For a nominal friction coefficient of 0.005 over the length of a straight section of 2.56 inches, this results in a drop in the Mach number from M=2.3 to M=1.8 for example. This condition is even more overexpanded and more likely to result in a normal shock wave where the output is subsonic and quiet.

Figure 19A:
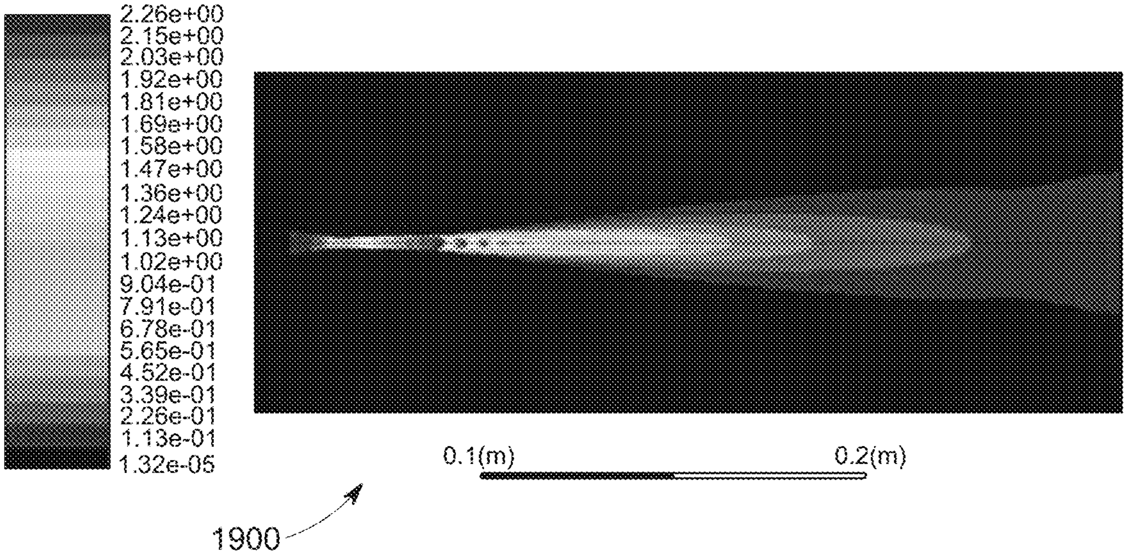
FIGS. 19A-B are CFD results showing Mach number distributions at 67 psig nozzle pressure using ANSYS Fluent for a standard #6 nozzle (FIG. 19A) and for an improved nozzle according to an embodiment of the present invention (FIG. 19B).
Figure 19B:
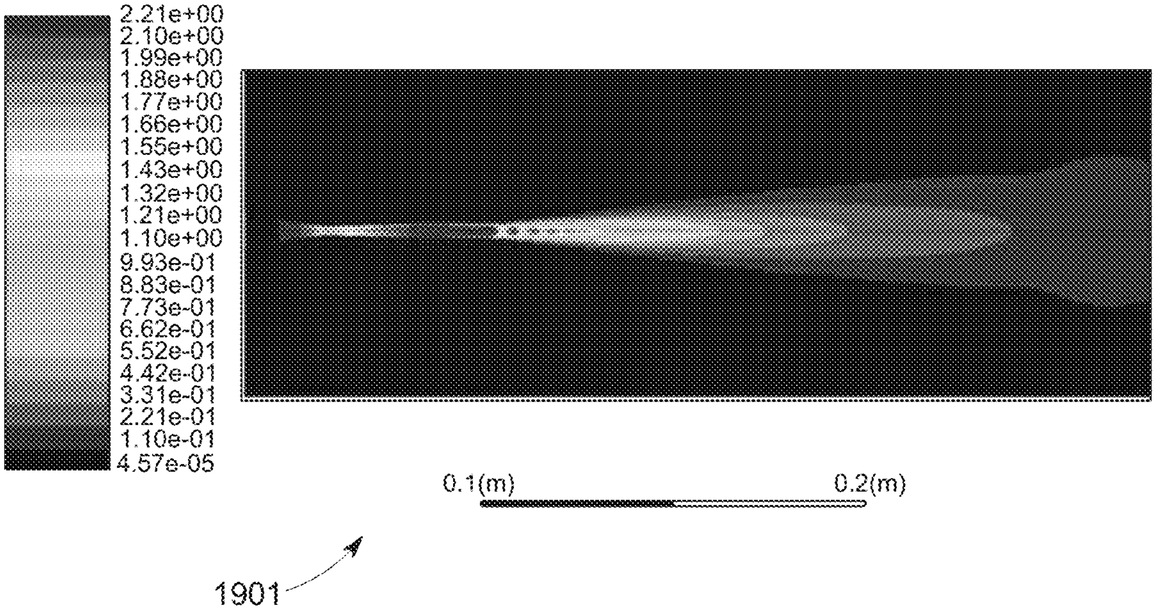
Figure 20A:
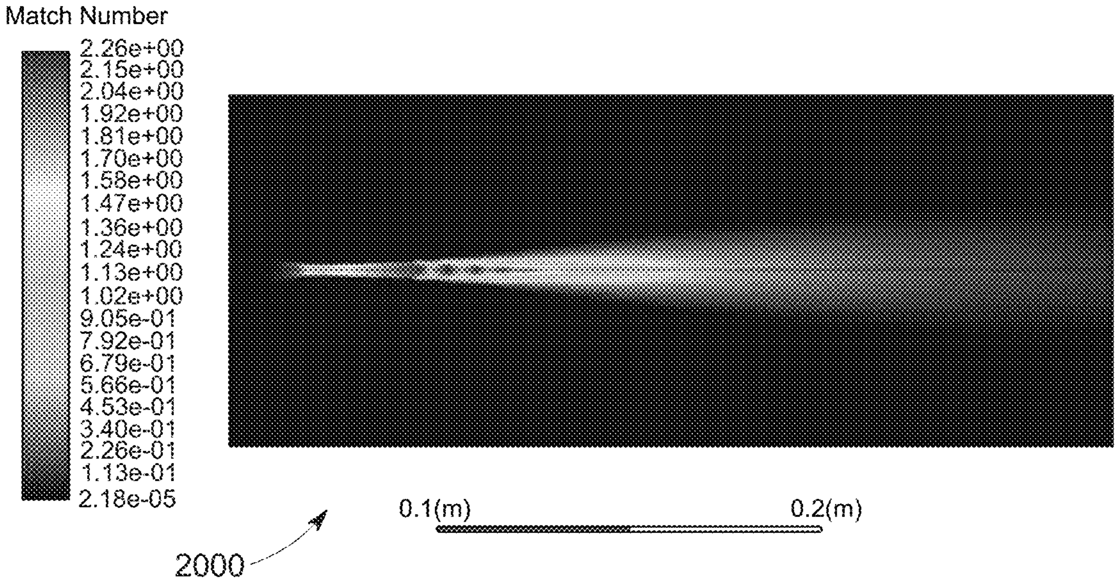
FIGS. 20A-B are CFD results showing Mach number distributions at 100 psig nozzle pressure using ANSYS Fluent for a standard #6 nozzle (FIG. 20A) and for an improved nozzle according to an embodiment of the present invention (FIG. 20B).
Figure 20B:
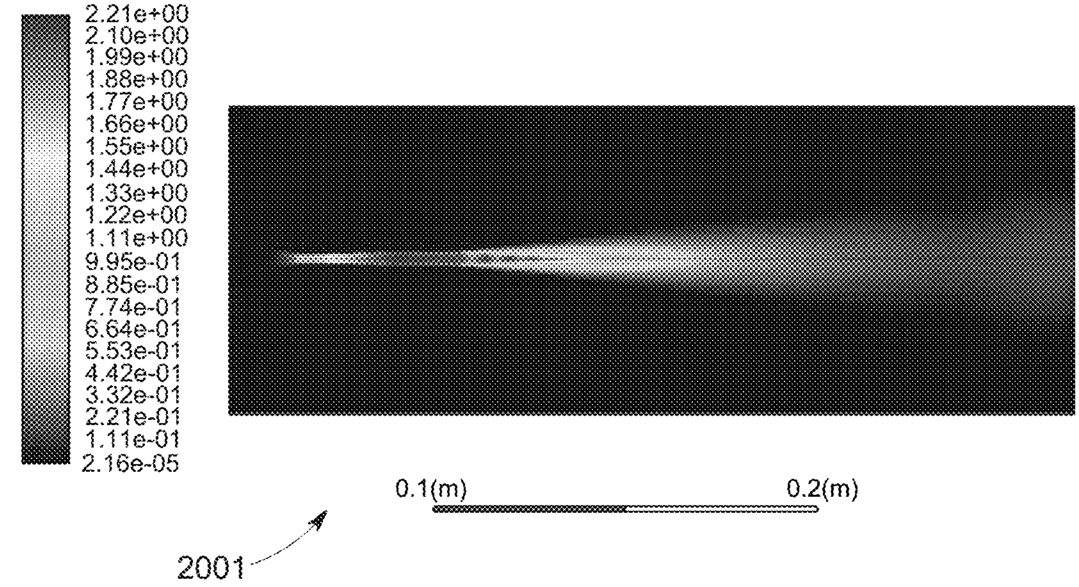

FIGS. 19A-B are CFD results 1900, 1901 showing Mach number distributions at 67 psig nozzle pressure using ANSYS Fluent for single phase compressible air flow with no media for a standard #6 nozzle (FIG. 19A) and for an improved nozzle according to an embodiment of the present invention (FIG. 19B). FIGS. 20A-B are CFD results 2000, 2001 showing Mach number distributions at 100 psig nozzle pressure using ANSYS Fluent for a standard #6 nozzle (FIG. 20A) and for an improved nozzle according to an embodiment of the present invention (FIG. 20B). Results clearly show that the improved nozzle has an extended acceleration section over a variety of conditions in comparison to a standard #6 nozzle. In this model, the improved nozzle with 67 psig has a slightly lower maximum Mach number than the standard #6 nozzle (2.21 versus 2.26), but a longer section over which there is supersonic flow to accelerate particles. Similar results were found at a 100 psig nozzle pressure.

Figure 21A:
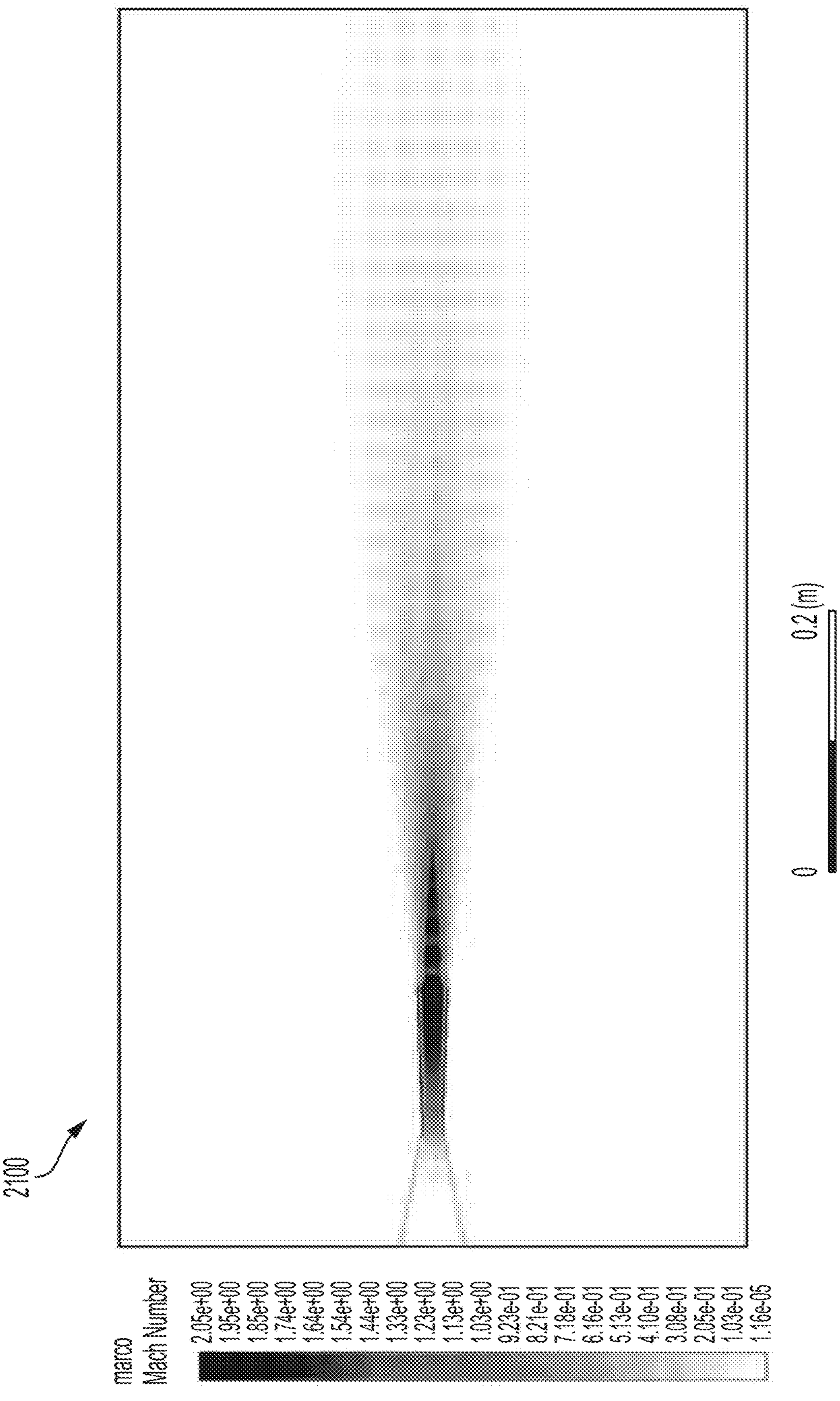
FIGS. 21A-B are CFD results showing Mach number distributions at 67 psig nozzle pressure with added wall drag using ANSYS Fluent for a standard #6 nozzle (FIG. 21A) and for an improved nozzle according to an embodiment of the present invention (FIG. 21B).
Figure 21B:
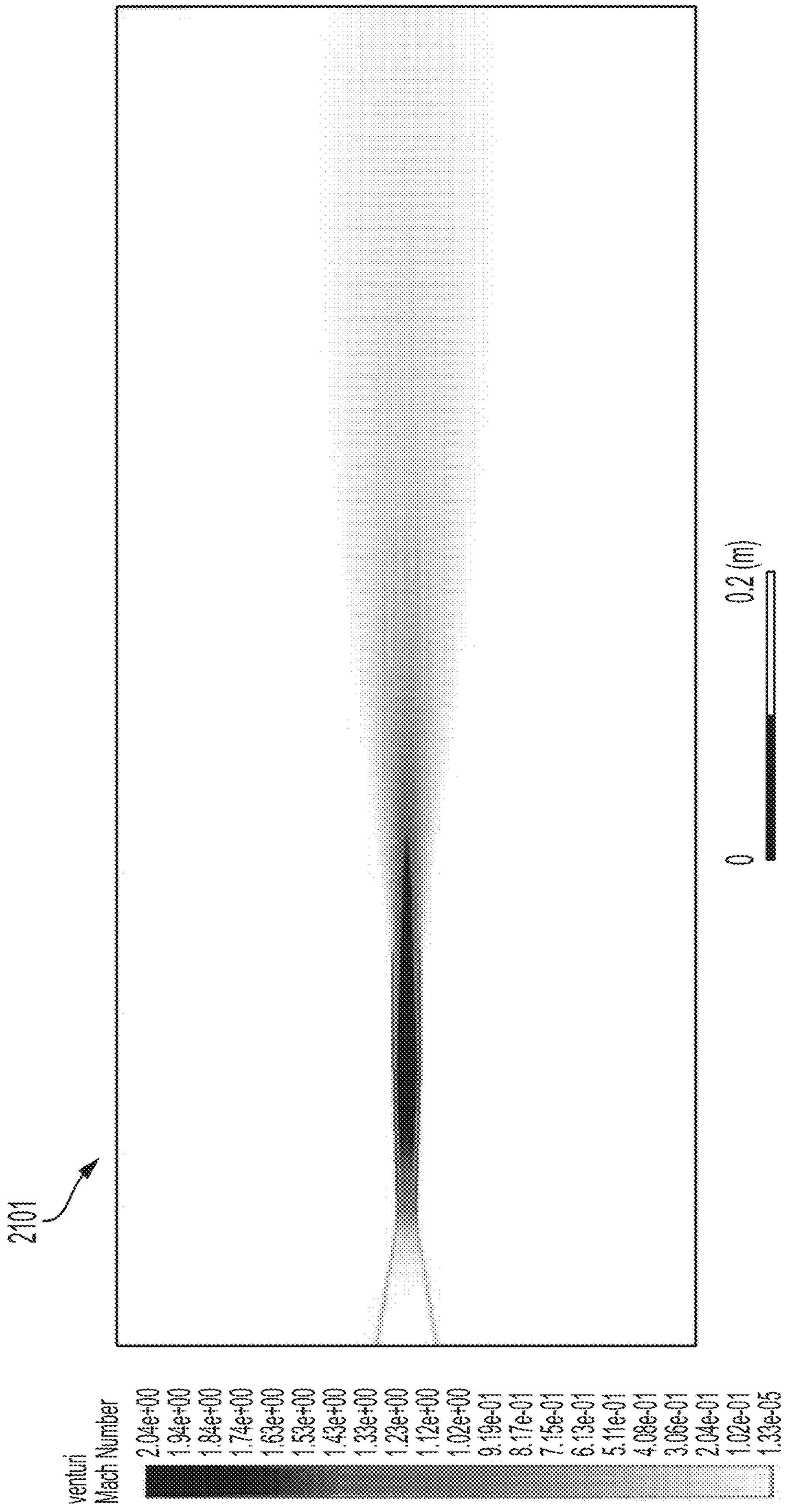

FIGS. 21A-B are CFD results 2100, 2101 showing Mach number distributions at 67 psig nozzle pressure with added wall drag using ANSYS Fluent for a standard #6 nozzle (FIG. 21A) and for an improved nozzle according to an embodiment of the present invention (FIG. 21B). The added wall drag uses an increased wall friction coefficient to simulate drag from particles on the flow. The main takeaway from this result is that the long straight nozzle section of the improved nozzle creates a greater effect on the flow structure.

Figure 22:
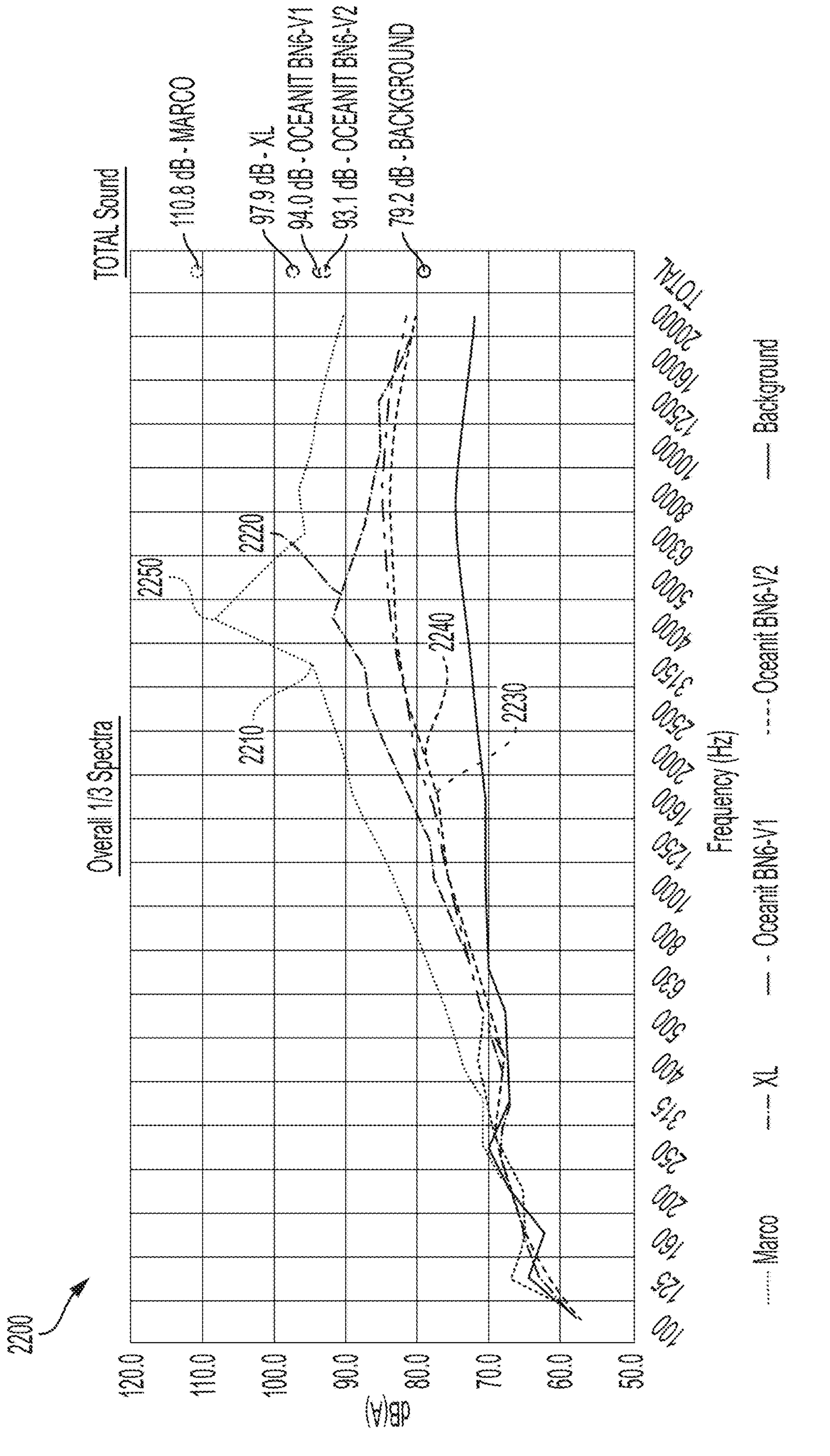
FIG. 22 is a graph showing average ⅓ octave sound spectra for a variety of nozzles.

FIG. 22 is a graph showing average ⅓ octave sound spectra for a variety of nozzles and is discussed in more detail below.

Figure 23:
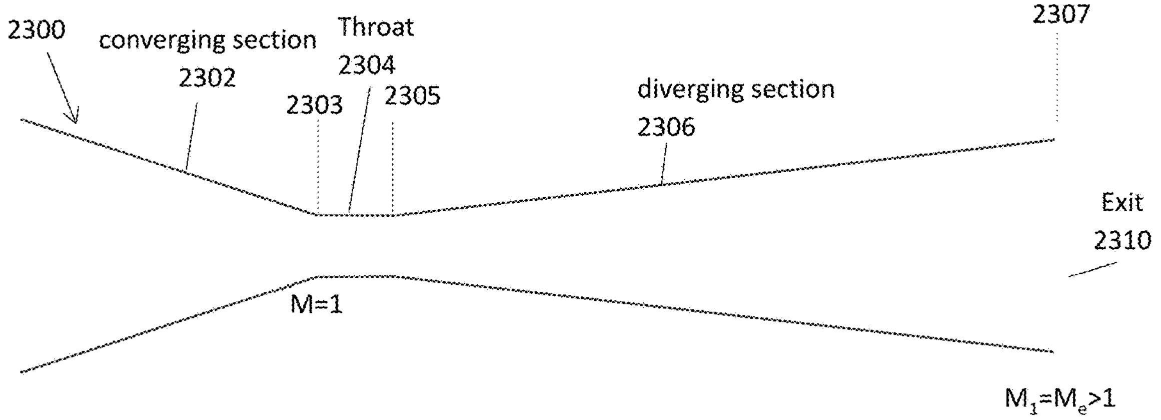
FIG. 23 PRIOR ART
FIG. 23 is a cross-sectional diagram of a standard convergent-divergent abrasive blasting nozzle.

FIG. 23 is a cross-sectional diagram of a standard convergent-divergent abrasive blasting nozzle 2300, the current state of the art, showing a Mach number of 1 at the throat 2304 and a Mach number of greater than 1 at the exit 2310. Converging section 2303 extends from the entrance of the nozzle to the beginning of the throat 2303 and diverging section 2306 extends from the end of the throat 2305 to the end of the nozzle 2307.

Figure 24:
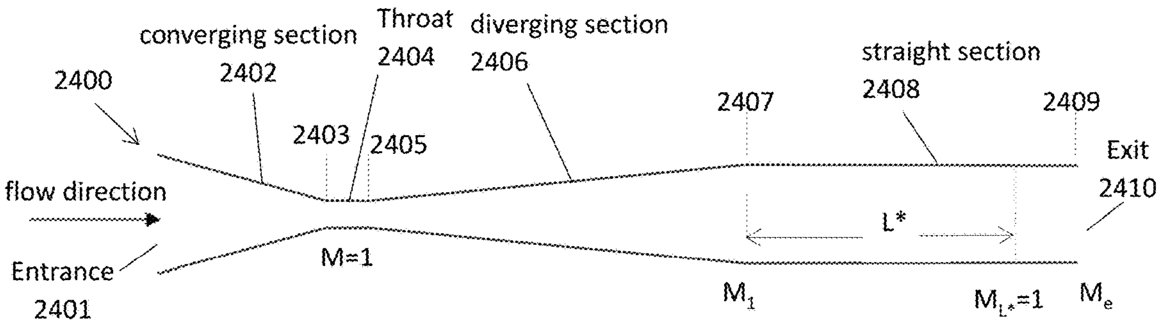
FIG. 24 shows the cross-section of an abrasive blasting nozzle, according to an embodiment of the current invention.

FIG. 24 shows the cross-section of a nozzle 2400 according to an embodiment of the current invention with a convergent section 2402 extending from the entrance 2401 of the nozzle to the beginning 2403 of a throat 2404, which ends at 2405 and is followed by a divergent section 2406 which transitions at point 2407 to a straight cylindrical section 2408, which extends until the end of the nozzle 2409. The Mach number at the exit of the divergent section 2407 is M1, which is greater than 1. L* indicates the length of the straight section cylinder 2408 at which the flow would become sonic (M=1) due to wall friction. At exit 2410, the flow has Mach number $M_e$ less than 1.

Figure 25:
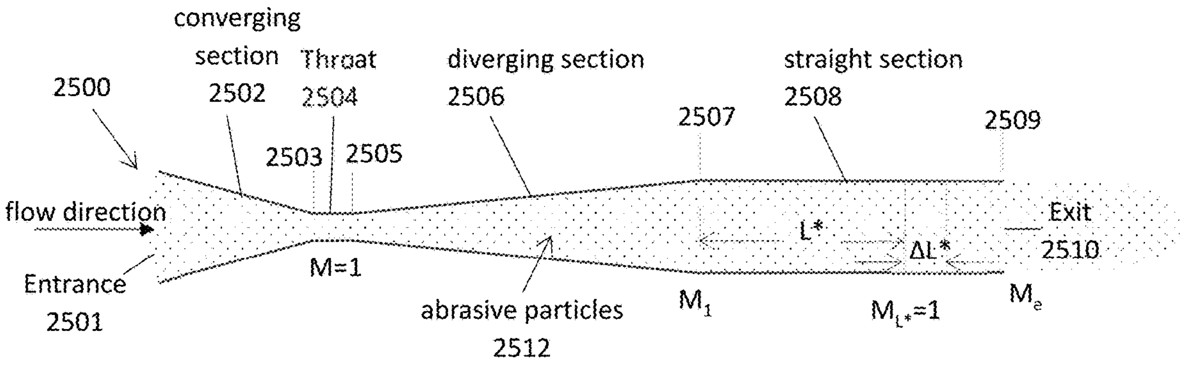
FIG. 25 shows the cross-section of an abrasive blasting nozzle, according to an embodiment of the current invention, with abrasive particles in the flow.

FIG. 25 shows the cross-section of a nozzle 2500 according to an embodiment of the current invention with a convergent section 2502 extending from the entrance 2501 to the beginning 2503 of a throat 2504, followed by a divergent section 2506 extending from the end 2505 of the throat to the beginning 2507 of a straight cylindrical section 2508 which continues to the end 2509 of the nozzle. Abrasive particles 2512 are in the flow through this nozzle 2500. ΔL indicates the reduced length of L* relative to the nozzle shown in FIG. 24 due to the introduction of abrasive particles 2512, which serves to reduce the energy in the flow.

Figure 26:
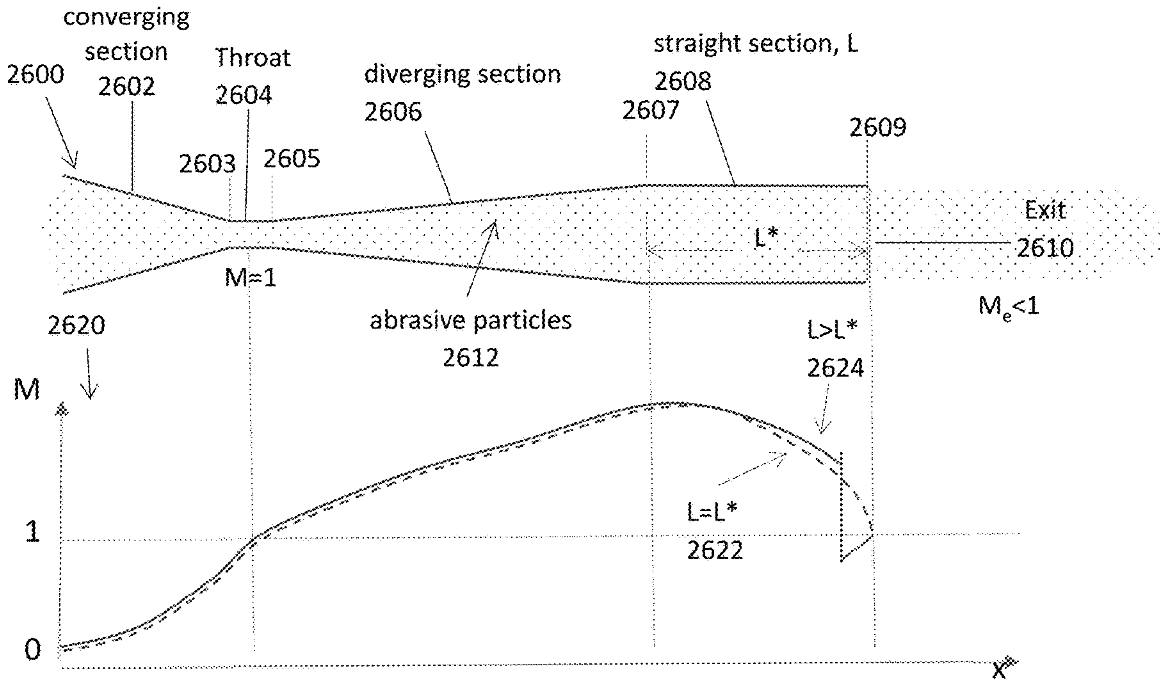
FIG. 26 shows the cross-section of an abrasive blasting nozzle, according to an embodiment of the current invention, where length=L* or length is slightly longer than L*.

FIG. 26 shows the cross-section of a nozzle 2600 according to an embodiment of the current invention, with a convergent section 2602 followed by a throat 2604 extending from throat inlet 2603 to throat outlet 2605, followed by a divergent section 2606 extending from the throat outlet 2605 to the inlet 2607 of a straight cylindrical section 2608 terminating at the end of the nozzle 2609, with abrasive particles 2612 in the flow-along with a Mach number graph 2620 indicating the Mach number (M) along the axial dimension (x) of the nozzle. For an optimized nozzle designed according to the present invention, the Mach number stays above 1 until the exit, indicated by the profile 2622 labeled "L=L*". For a slightly less optimized nozzle designed according to the present invention where the length of the straight section 2608 is slightly longer than L*, the Mach number will drop below 1 in the straight portion 2608 and then rise up to 1 at the exit 2610, as indicated by profile 2624.

Figure 27:
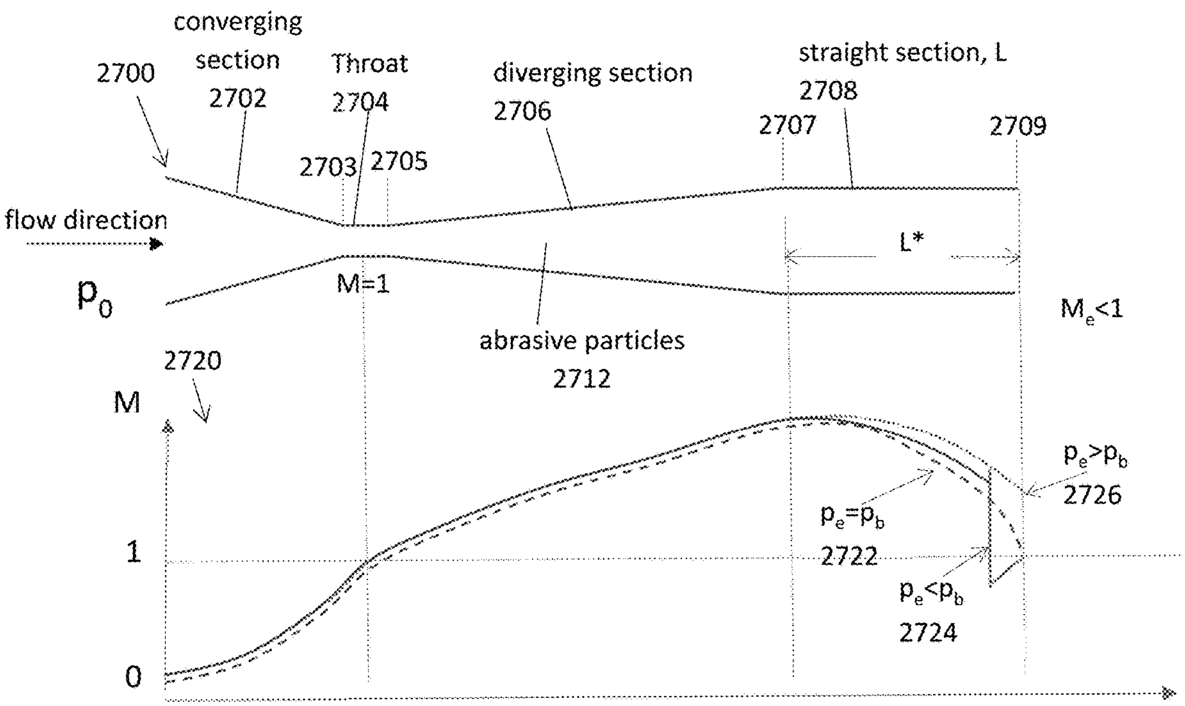
FIG. 27 shows the effect of raising or lowering the nozzle pressure on the exit condition of the nozzle straight section.

FIG. 27 shows the cross-section of a nozzle 2700 according to an embodiment of the current invention, with a convergent section 2702 followed by a throat 2704 extending from throat inlet 2703 to throat outlet 2705, followed by a divergent section 2706 extending from the throat outlet 2705 to the inlet 2707 of a straight cylindrical section 2708 terminating at the end of the nozzle 2709, with abrasive particles 2712 in the flow-along with a Mach number graph 2720 indicating the Mach number (M) along the axial dimension (x) of the nozzle. The profiles 2722, 2724, 2726 show the effect of raising or lowering the nozzle pressure on the exit condition of the nozzle straight section. When exit pressure, $p_e$, equals back pressure, $p_b$, and length L of the straight section 2708 equals L*, a shock wave forms in the flow at the exit as shown in profile 2722, resulting in subsonic flow after the exit. Increasing the nozzle pressure $p_0$ results in higher exit pressure $p_e$, and when $p_e$ exceeds back pressure $p_b$ as in profile 2726, supersonic exit flow with higher noise results. To avoid supersonic exit flow with such a nozzle pressure, the length L of straight section 2708 may be increased beyond L*, and/or friction of the internal nozzle walls and/or abrasive particles may be increased so that velocity of the gas flow in the straight section is reduced more rapidly. Decreasing the nozzle pressure results in lower exit pressure, $p_e$, and the shock wave moves upstream from the exit with a slight decrease in particle acceleration due to the lower Mach number profile, as in profile 2724.

The productivity and noise performance of the new nozzles described above were compared to standard commercially available #6 nozzles including a standard #6 and an extra-long (XL) nozzle. Prior to testing, twenty 18 inch×18 inch panels of 14 gauge steel were uniformly powder coated (10-12 mil coating thickness) to be used to evaluate nozzle productivity (time required to clean the panel to a set level). All tests were conducted with new 30/40 garnet media at a nozzle pressure of 67 psi.

For each nozzle tested the sound level was measured using a sound level meter at the operator's left shoulder while operating the nozzle into open air (to avoid the sound generated by sand hitting metal during actual blasting). The sound levels for the ⅓ octave bands were measured for a 10 second period and MIN, MAX and AVG sound levels were automatically calculated and stored. Background sound levels were also recorded to confirm that background noise did not contribute to the measured noise levels of the nozzles.

Next, video was recorded of each nozzle as it was used to blast one side of a powder coated test panel. The video was used to quantify the productivity of each nozzle (determine the time required to clean the test panel to a desired finish). The blaster's feedback after using each nozzle was also noted, including impressions of sound levels and productivity.

Table 1 summarizes the key results of the testing along with some operator comments. From the first round of testing the quietest and most productive nozzle was an improved nozzle termed Oceanit BN6V1, or Oceanit Short SS, which is the nozzle shown schematically in FIGS. 17A-B. It was 16 dB quieter and cleaned a test panel in 51 seconds vs 69 seconds for the standard long nozzle. The XL nozzle (XL #6) showed some improvement in sound performance but no gains in productivity, and was deemed too large and heavy for everyday use.

TABLE 1

Summary of test results.
(30/40 garnet at 70 psi nozzle pressure)

| Nozzle | Sound Level (dB) | Time to clean panel (sec) | Operator Notes |
|---|---|---|---|
| Standard | 110.8 | 69 | Typical nozzle. |
| #6 nozzle | 109.2 | 41 | |
| Oceanit | 94.7 | 51 | The operator's favorite nozzle. |
| BN6V1 | 94.0 | 39 | Noticeably lower sound with greatest productivity. Didn't heat warp the test panel as much as the standard nozzle. Less kickback than the standard nozzle (may be due to the weight of the Oceanit nozzle which is solid stainless steel). |
| Oceanit | 93.1 | 75 | Lower sound and similar |
| BN6V2 | 94.2 | 48 | productivity to standard nozzle. Extra length and weight made it less desirable than the Oceanit Short SS. |
| XL | 97.9 | 72 | Required more sand to eliminate nozzle screech. |

Based on the first round results, a second trial of the standard #6 nozzle and the two straight section Oceanit nozzles was performed (also shown in Table 1). Again, the Oceanit Short SS was the operator's favorite nozzle, and was 15.2 dB quieter than the standard #6 nozzle and cleaned a test panel in 39 seconds (vs 41 sec for the standard #6 nozzle). The Oceanit BN6-V1 was noticeably quieter than the standard #6 nozzle to the point where the operator felt ear protection was unnecessary, was more productive, had less kickback and caused less heat warp of the test panel.

The average sound levels measured for the ⅓ octave bands 2200 are shown in FIG. 22. These confirm that the sound levels for the two new straight section nozzles 2230 (BNG-V1), 2240 (BNG-V2) are lower than the standard nozzle 2210 across the entire spectrum and substantially lower than the XL nozzle 2220 across most of the spectrum as well. Also worth noting is the spike 2250 centered on 4000 Hz for the standard nozzle (standard #6) which may be associated with greater turbulence generation from a high-speed jet and/or jet screech—which is avoided by a subsonic exit velocity after a normal shock at the nozzle exit.

Further testing was conducted of the new nozzle with the shorter straight section (Oceanit BN6V1) against the standard #6 nozzle using steel shot media at a nozzle pressure of approximately 90 psi. The same coated panels described for the above testing were used to measure nozzle productivity (the time to blast clean a panel). Two trials of each nozzle were conducted. Results are shown in Table 2 below. In the first trial the new nozzle performed equal to the standard nozzle (~53 seconds each to clean a panel). In the second trial the new nozzle outperformed the standard nozzle (30 seconds vs. 47 seconds). Generally, the second trial is more reliable as the user has had time to adjust to a particular nozzle.

TABLE 2

| Steel shot 90 psi | | | |
|---|---|---|---|
| Nozzle | Sound Level (dB) | Time to clean panel (sec) | Operator Notes |
| Standard #6 nozzle | n/a | 53<br>47 | Typical nozzle. |
| Oceanit BN6V1 | n/a | 53<br>30 | Operators noted that the Oceanit BN6-V1 was noticeably quieter. |

Thus, the new reduced noise producing abrasive blasting nozzle is demonstrated to be superior in a commercial abrasive blasting setting. High particle speeds produce productive nozzles. Low exit air velocities produce low noise nozzles. The new nozzles maintain or improve the abrasive particle velocity exiting the nozzle while reducing the exit air velocity. The new nozzles (based on a #6 nozzle) utilize an extended exit section which extends the high-Mach number acceleration zone of the nozzle while producing a much lower exit velocity, in part (in some embodiments) through the creation of a normal shock wave at the end of the nozzle. The productivity of the new nozzles was shown to be better than the standard #6 nozzle in tests with garnet and steel shot while achieving 17 dB noise reduction over commercial nozzles, reduced kickback and resulting user fatigue, and improved handling characteristics. CFD modeling shows an improved particle acceleration zone.

Reduction in employee exposure to hazardous noise to below the OSHA 8-Hour Time Weighted Average alleviates the employers need to modify employees' current practices, decreases the need for personal protective equipment (PPE), reduces the likelihood of injury in the case of PPE failure, and ensures that personnel in adjacent "safe zones" are guaranteed to be safe from exposure. Most importantly, reducing noise in the blasting facility to 90 dBA or less allows workers to operate for a full 8-hour standard work day within OSHA compliance. It should also be appreciated that a noise reduction of, at minimum, 3 dBA would benefit workers utilizing such a quieter nozzle. Indeed, a noise reduction of, for example, 6 dBA would be significant in lowering the risk of injury for workers.

Although testing of a #6 nozzle embodiment is described above, other embodiments may be any size, including #8, #7, #4, and #5 nozzles, or a #6 90-degree nozzle or other 90-degree nozzles. The same design can be applied to any converging-diverging nozzle, using any type of abrasive media/material, including coal slag, garnet, acrylic, etc. Typically, compressed air is used. Water vapor could be used in some embodiments. The new nozzles may be made, for example, of tungsten carbide, silicon carbide, boron carbide, acrylic, ceramic, stainless steel, hardened steel, aluminum, any other known nozzle material, or combinations thereof (with or without a wear-resistant ceramic liner). The nozzles may have protective grips to improve handling and eliminate concerns of static electricity for stainless steel versions. The nozzles may be designed for and used with a variety of hose pressures and blast patterns.

As will be appreciated from the description, drawings and examples set forth above and referenced herein, reduced noise abrasive blasting systems of the present invention allow for abrasive blasting with significantly reduced resultant noise while providing the equivalent or improved productivity and efficiency compared with conventional abrasive blasting systems. Such improved reduced noise blasting systems promote worker health and safety and a quieter environment for those in the vicinity.

Embodiments of the improved abrasive blasting system exploit a lengthened accelerator section in the hosing and/or nozzle in order to maintain particle velocity while decreasing the gas exit velocity. A straight bore nozzle can be used to produce the desired active abrasive area. The maintained particle velocity provides the equivalent abrasive productivity while the decreased gas velocity provides for the reduced resultant noise.

While specific preferred embodiments and examples of fabrication and testing of the invention have been illustrated and described, it will be clear that the invention is not so limited. Numerous modifications or alterations, changes, variations, substitutions and equivalents will occur to those skilled in the art without deviating from the spirit and scope of the invention, and are deemed part and parcel of the invention disclosed herein.

By way of example and not limitation, the nozzle and hose dimensions, and the coupling types, and the specific configuration and sizes of hose, couplings, nozzle and accelerator section, can be varied in accordance with the general principals of the invention as described herein in order to accommodate different working conditions, target materials, project specification, budgetary considerations and user preferences. The nozzle may have any throat diameter, e.g. 1, 2, 3, 4, 5, 6, 7, 8, 9, 10, 11, 12, etc., including in embodiments featuring a new nozzle having a straight section. In addition, more than one transition coupling and accelerator hose section and inside diameter may be employed in the systems of the subject invention. The invention described herein is inclusive of all such modifications and variations.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features.

Accordingly, it is appropriate that the foregoing description be construed broadly and understood as being given by way of illustration and example only, the spirit and scope of the invention being limited only by the claims which ultimately issue.

The invention claimed is:

1. A productive abrasive blasting nozzle, comprising:

a converging portion having a converging internal diameter;

a throat having an internal diameter connected to the converging portion, wherein the throat has a length extending from a beginning of the throat to an end of the throat;

a diverging portion having an internal diameter connected to the throat; and a straight portion having an internal diameter connected to and immediately following the diverging portion;

wherein the straight portion has a length such that a velocity of gas exiting the blasting nozzle is reduced by at least 30% relative to the blasting nozzle with the straight portion removed, when operated with a predetermined gas and particle mix and pressure;

wherein, in operation, fluid flows through the converging portion, the throat, the diverging portion, and the straight portion, in that order; and wherein the length, L, of the straight portion is at least L*, as given by the following equation:

$$L^* = \frac{D}{4(\bar{f} + f_{abrasives})}\left[\frac{1-M^2}{\gamma M^2} + \frac{\gamma+1}{2\gamma}\ln\left(\frac{(\gamma+1)M^2}{2+(\gamma-1)M^2}\right)\right]$$

where D is a diameter of the straight section, M is the Mach number of the fluid at an entrance to the straight portion, $\bar{f}$ is the average friction factor of the straight portion, $f_{abrasives}$ is the friction factor of the particles in the fluid flow, and γ is the specific heat ratio of the fluid flow, for a predetermined gas and abrasive particle mixture.

2. The productive abrasive blasting nozzle of claim 1, wherein an internal diameter of the straight portion is less than a largest internal diameter of the converging portion.

3. A productive abrasive blasting nozzle assembly comprising the reduced noise abrasive blasting nozzle of claim 1.

4. The productive abrasive blasting nozzle of claim 1, wherein the nozzle is configured such that, for the predetermined gas and particle mix and pressure, supersonic flow occurs inside of the nozzle and the supersonic gas flow accelerates the abrasive particles in the straight section.

5. The productive abrasive blasting nozzle of claim 1, wherein the nozzle is configured such that gas Mach number for the predetermined gas and particle mix and pressure is lower at the exit of the straight portion than at the exit of the diverging portion, thereby reducing noise of operation.

6. The productive abrasive blasting nozzle of claim 5, wherein the nozzle is configured such that gas Mach number for the predetermined gas and particle mix and pressure is reduced from greater than one at the exit of the diverging portion to one at the exit of the straight portion.

7. The productive abrasive blasting nozzle of claim 1, wherein the length of the straight portion is at least twenty percent of the internal diameter of the straight portion.

8. The productive abrasive blasting nozzle of claim 1, wherein the length of the straight portion is less than ten times the internal diameter of the straight portion.

9. The productive abrasive blasting nozzle of claim 1, wherein the length of the straight portion is between 1" and 10".

10. The productive abrasive blasting nozzle of claim 1, wherein the length of the straight portion is 2.5".

11. The productive abrasive blasting nozzle of claim 1, wherein the straight portion is configured to be attached to and detached from the diverging portion.

12. The productive abrasive blasting nozzle of claim 11, further comprising one or more additional straight portions configured to be attached to and detached from the diverging portion, wherein the straight portion and the one or more additional straight portions each have a different length or inner diameter.

13. The productive abrasive blasting nozzle of claim 12, wherein each of the one or more additional straight portions has a length such that, when operated with a different predetermined gas and particle mix and pressure, a velocity of gas exiting the blasting nozzle is reduced by at least 30% relative to the blasting nozzle with the straight portion removed.

14. The productive abrasive blasting nozzle of claim 1, wherein the straight portion is cylindrical in shape.

15. The productive abrasive blasting nozzle of claim 1, wherein the nozzle is a #4 nozzle, a #5 nozzle, a #6 nozzle, a #7 nozzle, or a #8 nozzle.

16. The productive abrasive blasting nozzle of claim 1, further comprising fluid flowing through the diverging portion with a Mach number of greater than 1 at an exit from the diverging portion to the straight portion.

17. The productive abrasive blasting nozzle of claim 1, further comprising fluid flowing through the straight portion with a Mach number of 1 at an exit from the straight portion.

18. The productive abrasive blasting nozzle of claim 1, further comprising a plurality of abrasive particles in supersonic fluid flow inside the nozzle, the supersonic fluid flow experiencing a shock wave in the straight portion.

19. The productive abrasive blasting nozzle of claim 1, wherein the nozzle is made from a material selected from the group consisting of tungsten carbide, silicon carbide, boron carbide, acrylic, ceramic, stainless steel, hardened steel, aluminum, or combinations thereof.

20. The productive abrasive blasting nozzle of claim 1, wherein the nozzle further comprises at least one protective grip.

21. The productive abrasive blasting nozzle of claim 1, wherein the length of the straight portion is such that the blasting nozzle has a noise level of 90 dBA or less when operated with the predetermined gas and particle mix and pressure.

22. A method for manufacturing the nozzle of claim 1 to reduce noise of the nozzle without reducing productivity of the nozzle, the method comprising:

for the predetermined gas and abrasive particle mixture and pressure, determining a minimum length of the straight portion of claim 1 required to produce a Mach number of 1 for the gas at, or within one straight section internal diameter before, the exit from the straight portion; and manufacturing the nozzle with a straight portion having a length equal to or greater than the minimum length.

23. The method of claim 22, further comprising:

determining an optimal length of the straight portion of claim 1 such that Mach number of the gas decreases from a peak at a first point being the end of the diverging portion to a Mach number of 1 at a second point at, or within a length equal to an internal diameter of the straight portion before, the exit of the straight portion without going subsonic between the first point and the second point; and manufacturing the nozzle with a straight portion having the optimal length.

24. The method of claim 23, wherein the determining an optimal length step comprises:

analyzing an effect of friction from walls of the straight section, or analyzing an effect of the plurality of abrasive particles reducing air flow velocity in the straight portion.

25. The method of claim 22, further comprising adjusting the length of the straight portion for specific operating conditions to determine which length produces a desired combination of sound reduction and productivity, and manufacturing the nozzle to have that length.

26. The method of claim 22, further comprising conducting iterative computer simulations of nozzles of claim 1 over a range of straight portion lengths to find a length having a desired combination of sound reduction and productivity, and manufacturing the nozzle to have that length.

27. The productive abrasive blasting nozzle of claim 1, wherein the length of the straight portion is such that the blasting nozzle has a reduction in noise level of 3 dBA or more compared to the blasting nozzle without the straight portion, when operated with the predetermined gas and particle mix and pressure.

28. The productive abrasive blasting nozzle of claim 1, wherein the length of the straight portion is such that the blasting nozzle has a reduction in noise level of 6 dBA or more compared to the blasting nozzle without the straight portion, when operated with the predetermined gas and particle mix and pressure.

29. A productive abrasive blasting nozzle, comprising:

a converging portion having a converging internal diameter;

a throat having an internal diameter connected to the converging portion, wherein the throat has a length extending from a beginning of the throat to an end of the throat;

a diverging portion having an internal diameter connected to the throat; and a straight portion having an internal diameter connected to and immediately following the diverging portion;

wherein the straight portion has a length such that a velocity of gas exiting the blasting nozzle is reduced by at least 30% relative to the blasting nozzle with the straight portion removed, when operated with a predetermined gas and particle mix and pressure;

wherein, in operation, fluid flows through the converging portion, the throat, the diverging portion, and the straight portion, in that order; and wherein the length, L, of the straight portion is at least L" adjusted for a ratio of back pressure to exit pressure, where L' is given by the following equation:

$$L^{*} = \frac{D}{4(\bar{f} + f_{abrasives})}\left[\frac{1 - M^2}{\gamma M^2} + \frac{\gamma + 1}{2\gamma}\ln\left(\frac{(\gamma + 1)M^2}{2 + (\gamma - 1)M^2}\right)\right]$$

where D is a diameter of the straight section, M is the Mach number of the fluid at an entrance to the straight portion, $\bar{f}$ is the average friction factor of the straight portion, $f_{abrasives}$ is the friction factor of the particles in the fluid flow, and $\gamma$ is the specific heat ratio of the fluid flow, for a predetermined gas and abrasive particle mixture.

* * * * *